(12) United States Patent
Hooker

(10) Patent No.: US 7,937,661 B2
(45) Date of Patent: May 3, 2011

(54) MANAGEMENT INTERFACE FOR RADIO STATIONS

(75) Inventor: Guy Alexander Hooker, Christchurch (NZ)

(73) Assignee: Tait Electronics Limited, Christchurch (NZ)

( * ) Notice: Subject to any disclaimer, the term of this patent is extended or adjusted under 35 U.S.C. 154(b) by 334 days.

(21) Appl. No.: 10/547,964

(22) PCT Filed: Mar. 3, 2004

(86) PCT No.: PCT/NZ2004/000041
§ 371 (c)(1),
(2), (4) Date: Jul. 25, 2006

(87) PCT Pub. No.: WO2004/079620
PCT Pub. Date: Sep. 16, 2004

(65) Prior Publication Data
US 2007/0156885 A1    Jul. 5, 2007

(30) Foreign Application Priority Data
Mar. 3, 2003 (NZ) ........................... 524509

(51) Int. Cl.
*G06F 3/00* (2006.01)
(52) U.S. Cl. .................................... 715/716; 715/749
(58) Field of Classification Search .................. 715/716, 715/728, 749
See application file for complete search history.

(56) References Cited

U.S. PATENT DOCUMENTS

| 6,505,341 | B1 * | 1/2003 | Harris et al. ............... 717/100 |
| 6,721,925 | B2 * | 4/2004 | Wheeler et al. ............ 716/2 |
| 6,853,867 | B1 * | 2/2005 | Klindt et al. ............... 700/83 |
| 6,892,350 | B1 * | 5/2005 | Oba et al. .................. 715/716 |
| 6,910,068 | B2 * | 6/2005 | Zintel et al. ............... 709/220 |
| 7,146,408 | B1 * | 12/2006 | Crater et al. .............. 709/219 |
| 7,228,129 | B1 * | 6/2007 | Ward et al. ................ 455/423 |
| 7,490,171 | B2 * | 2/2009 | Saint-Hilaire et al. ..... 709/249 |
| 7,498,999 | B2 * | 3/2009 | Shtrom ..................... 343/853 |
| 7,523,214 | B2 * | 4/2009 | Kikkawa et al. ........... 709/231 |
| 7,525,486 | B2 * | 4/2009 | Shtrom et al. ............. 343/700 MS |

(Continued)

FOREIGN PATENT DOCUMENTS

| GB | 2347525 A | 9/2000 |
| WO | WO 2004/019642 A1 | 3/2004 |

OTHER PUBLICATIONS

International Search Report, PCT/NZ2004/000041, mailed Jun. 8, 2004.

(Continued)

*Primary Examiner* — William L Bashore
*Assistant Examiner* — David Phantana-angkool
(74) *Attorney, Agent, or Firm* — Blakely Sokoloff Taylor & Zafman LLP

(57) ABSTRACT

A graphical management interface for a radio station that simplifies programming interactions for a user. The interface has a display region for presenting programmed functions of the station. The region has first and second controls for user selection of input conditions to form programmed functions, and for user selection of output actions to be carried out by the station in response to the selected input conditions. At least one further control for user editing of the functions is also provided. The first and second controls list substantially every available input condition and every available output action of the station for selection by the user. Backplane management of the station can also be done in software.

19 Claims, 23 Drawing Sheets

Custom Inputs

| 1 | DETECTED_DATA_CHANNEL | TIME_OUT_TIMER#1 NOT DET_SUBAUDIBLE_TONE#1 | AND |
| 2 | DETECTED_SPEECH_CHANNEL | TIME_OUT_TIMER#1 DET_SUBAUDIBLE_TONE#1 | AND |

Task for Path A i *Looking for Data channel after CTCSS decoding delay*
IF RX_VALID THEN START_TIMER#1
IF NOT RX_VALID THEN STOP_TIMER#1
IF DETECTED_DATA_CHANNEL THEN GOTO_CHANNEL_002

Task for Path B i *Looking for Speech channel after CTCSS decoding delay*
IF RX_VALID THEN START_TIMER#1
IF NOT RX_VALID THEN STOP_TIMER#1
IF DETECTED_SPEECH_CHANNEL THEN GOTO_CHANNEL_001

U.S. PATENT DOCUMENTS

| | | | |
|---|---|---|---|
| 7,778,633 B2 * | 8/2010 | Ward | 455/423 |
| 2001/0003191 A1 | 6/2001 | Kovacs et al. | |
| 2004/0041844 A1 | 3/2004 | Grooms | |
| 2004/0044554 A1 | 3/2004 | Bull et al. | |

OTHER PUBLICATIONS

International Preliminary Report on Patentability, PCT/NZ2004/000041, mailed Feb. 17, 2005.

* cited by examiner

| Select input task | if input |
|---|---|
| Select action | Rx enable |
| Enter task | |
| Select negative input task | If (not) input |
| Select negative action | Rx disable |
| Enter task | |
| | |

FIGURE 9a

| if INPUT then | |
|---|---|
| Classification: GENERAL | Classification: CHANNEL PROFILE |
| Another receiver in rack | CWID enabled |
| Base station in run mode | Encryption enabled |
| Counter at maximum (*ident*) | Intercom enabled |
| Flag set (*ident*) | Line controlled base enabled |
| External channel select enabled | Loopback enabled |
| Power saving enabled | PA carrier present |
| Timer expired (*ident*) | PA keyed by Tx Key line |
| Tx relay enabled | PA keyed by valid Rx |
| Classification: ALARMS | Receiver enabled |
| Base station alarm on | Receiving valid signal |
| Battery protection mode on | Rx Gate line active |
| Battery voltage high | Talk through repeated enabled |
| Battery voltage low | Transmitter enabled |
| Channel invalid | Tx Key input enabled |
| Email service enabled | Classification: SIGNALLING PROFILE |
| External reference absent | DTMF 01 received – DTMF 08 received |
| External reference invalid | Keytone detected |
| Fan failed | Selcall 01 received – Selcall 08 received |
| Forward power low | Subtone decoding enabled |
| General log almost full | Subtone encoding enabled |
| Mains supply failed | Tone 01 detected – Tone 16 detected |
| No PA Detected | Tone Remote 00 detected – Tone Remote FF detected |
| No PMU detected | Classification: SYSTEM I/O |
| Over the air alarm on | Analog input high |
| Over the line alarm on | Analog input low |
| PA air intake temperature high | Balanced input low |
| PA air intake temperature low | Digital Input 01 active – Digital Input 16 active |
| PA alarm on | Digital Output 01 active – Digital Output 08 active |
| PA current fault | RSSI high |
| PA fan servicing advised | RSSI low |
| PA is shut down | Unbalanced input low |
| PA power foldback | |
| PA startup fault | |
| PA supply voltage fault | |
| PA temperature high | |
| PMU alarm on | |
| PMU fan servicing advised | |
| PMU output fault | |
| PMU power up fault | |
| PMU shutdown imminent | |
| PMU temperature high | |
| Reciter alarm on | |
| Reverse power high | |
| Synthesiser failed | |
| VSWR fault | |

FIGURE 9b

| then ACTION | |
|---|---|
| Classification: GENERAL | Classification: CHANNEL PROFILE |
| Decrement counter (*ident*) | Disable CWID |
| Increment counter (*ident*) | Enable CWID |
| Reset counter (*ident*) | Toggle CWID |
| Disable encryption | Go to channel .. |
| Enable encryption | Go to next channel |
| Toggle encryption | Disable line controlled base station |
| Disable external channel select | Enable line controlled base station |
| Enable external channel select | Toggle line controlled base station |
| Toggle external channel select | Make current channel the default |
| Fan test now | Disable talk through repeater |
| Clear flag (*ident*) | Enable talk through repeater |
| Set flag (*ident*) | Toggle talk through repeater |
| Disable intercom | Transmit CWID now |
| Enable intercom | |
| Toggle intercom | Classification: SYSTEM I/O |
| Disable loopback | Activate digital output (*ident*) |
| Enable loopback | Deactivate digital output (*ident*) |
| Toggle loopback | Enable Tx relay |
| Disable power save | Disable Tx relay |
| Enable power save | Toggle Tx relay |
| Toggle power save | |
| Disable receiver | |
| Enable receiver | |
| Toggle receiver | |
| Reset base station | |
| Start timer (*ident*) | |
| Stop timer (*ident*) | |
| Disable transmitter | |
| Enable transmitter | |
| Toggle transmitter | |
| Disable Tx Key | |
| Enable Tx Key | |
| Toggle Tx Key | |
| Classification: ALARMS | |
| Send alarm log now | |
| Clear alarm log | |
| Disable Email service | |
| Enable Email service | |
| Toggle Email service | |
| Email Status now | |
| Stop over the air alarm | |
| Start over the air alarm | |
| Toggle over the air alarm | |
| Stop over the line alarm | |
| Start over the line alarm | |
| Toggle over the line alarm | |
| Classification: SIGNALLING PROFILE | |
| Disable subaudible decoding | |
| Enable subaudible decoding | |
| Toggle subaudible decoding | |
| Disable subaudible encoding | |
| Enable subaudible encoding | |
| Toggle subaudible encoding | |

| Input states | | Output State | | | | | |
|---|---|---|---|---|---|---|---|
| A | B | AND | NAND | XOR | XNOR | OR | NOR |
| inactive | inactive | inactive | Active | inactive | active | inactive | active |
| inactive | active | inactive | Active | active | inactive | active | inactive |
| active | inactive | inactive | Active | active | inactive | active | inactive |
| active | active | active | Inactive | inactive | active | active | inactive |

FIGURE 12

IO
>*Usually doing simple control using inputs*

| |
|---|
| If digital input 1 then enable receiver |
| If not digital input 1 then disable receiver |
| If digital input 2 then enable CTCSS encode |
| If not digital input 3 then disable CTCSS encode |

ALARMS
>*Usually "if fault then alarm"*

| |
|---|
| If PA Low Power then enable over the air alarms |
| If PA VSWR Fault then enable over the air alarms |
| If Synth Out of lock then Email alarms |

BACKPLANE
>*Example to make changeover system if line fails*

| |
|---|
| If base station started then disable Talk through repeater |
| If base station started then enable Line Controlled Base |
| If input line level low then enable Talk through repeater |
| If input line level low then email status |
| If input line level low then disable Line Controlled Base |

MINI APPLICATION
>Example to control airport runway lights by pressing PTT 3 times

| |
|---|
| i *Detect three presses quicker than 2 seconds apart* |
| IF DETECTED_FIRST_PRESS THEN START_TIMER#1 |
| IF DETECTED_OTHER_PRESS THEN INCREMENT_COUNTER#1 |
| IF TIME_OUT_TIMER#1 THEN RESET_COUNTER#1 |
| i *Lights on* |
| IF COUNTER#1_AT_MAX THEN START_TIMER#2 |
| IF COUNTER#1_AT_MAX THEN SET_DIGITAL_OUTPUT#1 |
| IF COUNTER#1_AT_MAX THEN RESET_COUNTER#1 |
| i *Lights off* |
| IF TIME_OUT_TIMER#2 THEN CLEAR_DIGITAL_OUTPUT#1 |

FIGURE 19

Custom Inputs

| 1 | DETECTED_DATA_CHANNEL | TIME_OUT_TIMER#1 | AND |
|---|---|---|---|
| | | NOT DET_SUBAUDIBLE_TONE#1 | |
| 2 | DETECTED_SPEECH_CHANNEL | TIME_OUT_TIMER#1 | AND |
| | | DET_SUBAUDIBLE_TONE#1 | |

Task for Path A

```
i Looking for Data channel after CTCSS decoding delay
IF RX_VALID THEN START_TIMER#1
IF NOT RX_VALID THEN STOP_TIMER#1
IF DETECTED_DATA_CHANNEL THEN GOTO_CHANNEL_002
```

Task for Path B

```
i Looking for Speech channel after CTCSS decoding delay
IF RX_VALID THEN START_TIMER#1
IF NOT RX_VALID THEN STOP_TIMER#1
IF DETECTED_SPEECH_CHANNEL THEN GOTO_CHANNEL_001
```

MANAGEMENT INTERFACE FOR RADIO STATIONS

CROSS-REFERENCES TO RELATED APPLICATIONS

The present patent application is a national phase application of International Application No. PCT/NZ2004/000041 filed Mar. 3, 2004, which claims priority from New Zealand Application No. 524509 filed Mar. 3, 2003.

FIELD OF THE INVENTION

This invention relates to the management of stations in a radio network, in particular but not only to user programming of tasks that are carried out in a base station.

BACKGROUND TO THE INVENTION

Most functions for managing the components of a mobile radio network are hardwired or pre-programmed in the equipment according to standard requirements. However, many network operators require special functions that must be programmed or "scripted" separately, either on installation or later during upgrades. In some cases the operators are willing to program their own special functions. A range of programming tools are available for radio base stations and other items of network equipment, such as mobile units. They are often complex and in general are not easily used by untrained operators. The term "station" in this specification is intended to include mobile, portable and the full range of other radio devices in addition to base stations.

SUMMARY OF THE INVENTION

It is an object of the invention to assist programming of management tasks in radio base stations, or at least to provide alternatives to existing systems for management of such equipment. In general terms, the invention enables much of the management to be carried by programming tasks in software.

In one aspect the invention may be said to consist in a graphical management interface for a radio station, including: a display region for presenting programmed functions of the station, a first control for user selection of input conditions to form programmed functions, a second control for user selection of output actions to be carried out by the station in response to the selected input conditions, and at least one further control for user editing of the functions.

Preferably the first and second controls list substantially every available input condition and output action of the station for selection by the user. Preferably the functions include control of station IO, station alarms and external equipment. Preferably the task management screen is accessible by the user directly from screens for configuration of radio channel profiles, signalling or alarms. Preferably the station is a radio base station or a mobile station.

In another aspect the invention may be said to consist in a method of enabling management of a radio station, comprising: presenting a user with a graphical interface including a task management screen, receiving selection of an input condition from a first control on the management screen, receiving selection of an output action to follow the input condition from a second control on the management screen, displaying the input condition and the output action on the screen as a combined programming function, and storing the programming function for execution by the station.

Preferably the method further comprises enabling access to the task management screen directly from screens for configuration of radio channels and alarms. Preferably the method further comprises displaying a list of programming functions on the management screen in a combined condition/action form for review and editing by the user. Preferably the method further comprises provision of maintenance functions for the user.

In other aspects the invention includes a task manager software application for a personal computer or a radio station that enables a graphical interface or a method as defined above.

In still another aspect the invention consists in a graphical method for enabling creation of Boolean statements. In a further aspect the invention consists in a graphical method for enabling management of the backplane of a radio station.

The invention may also be said to consist in any alternative combination of features that are indicated in this specification. All equivalents of these features are considered to be included, whether or not explicitly set out.

LIST OF FIGURES

Preferred embodiments of the invention will be described with reference to the accompanying drawings, of which:

FIG. 1 schematically shows components of a radio base station,

FIG. 2 outlines the overall operation of a task manager in the base station,

FIG. 3 indicates connection of a software service kit to the base station,

FIG. 4 is the main screen of a service kit that has been developed,

FIG. 5 indicates how a task manager is accessible in the kit,

Figure 7A:
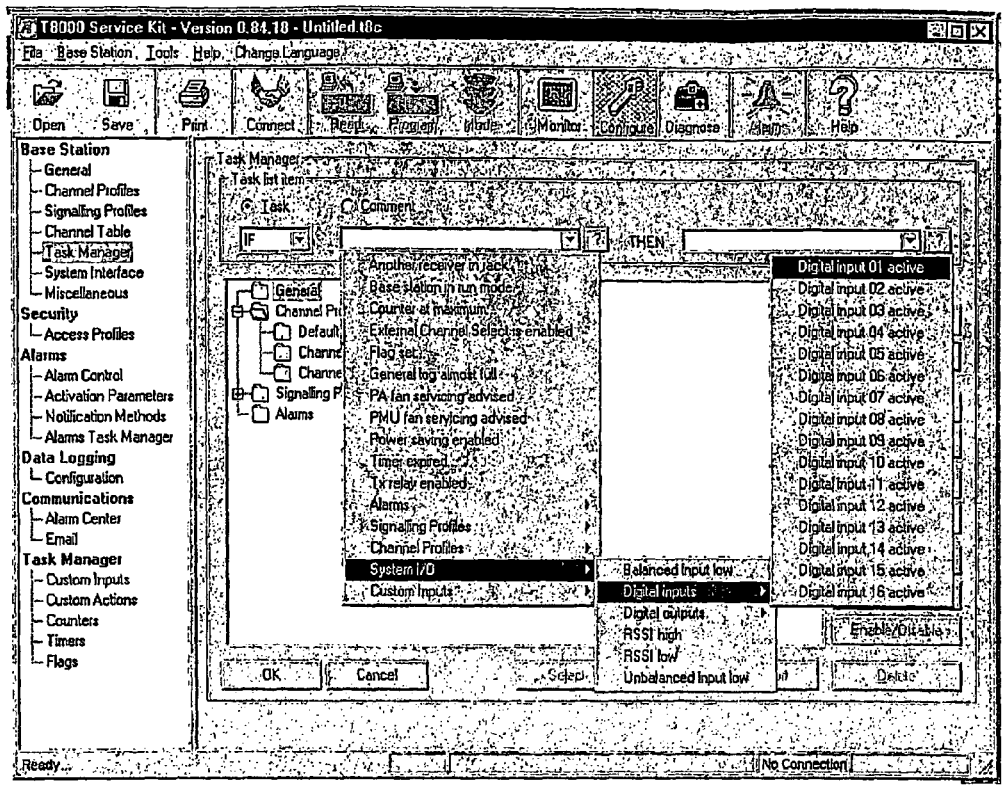
Figure 7B:
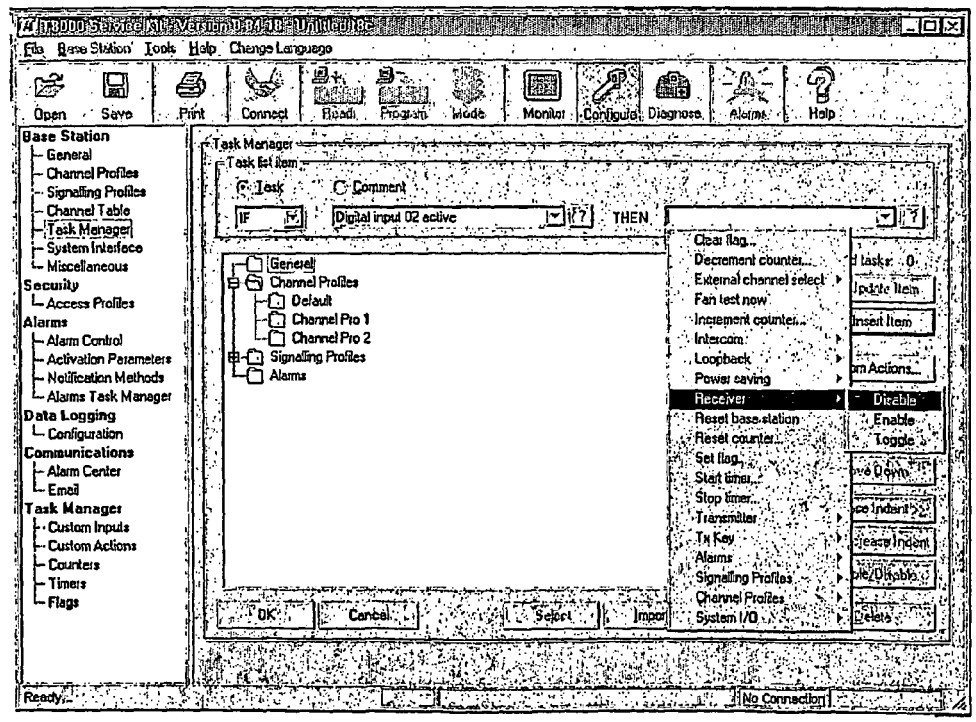
Figures 7C, 7D:
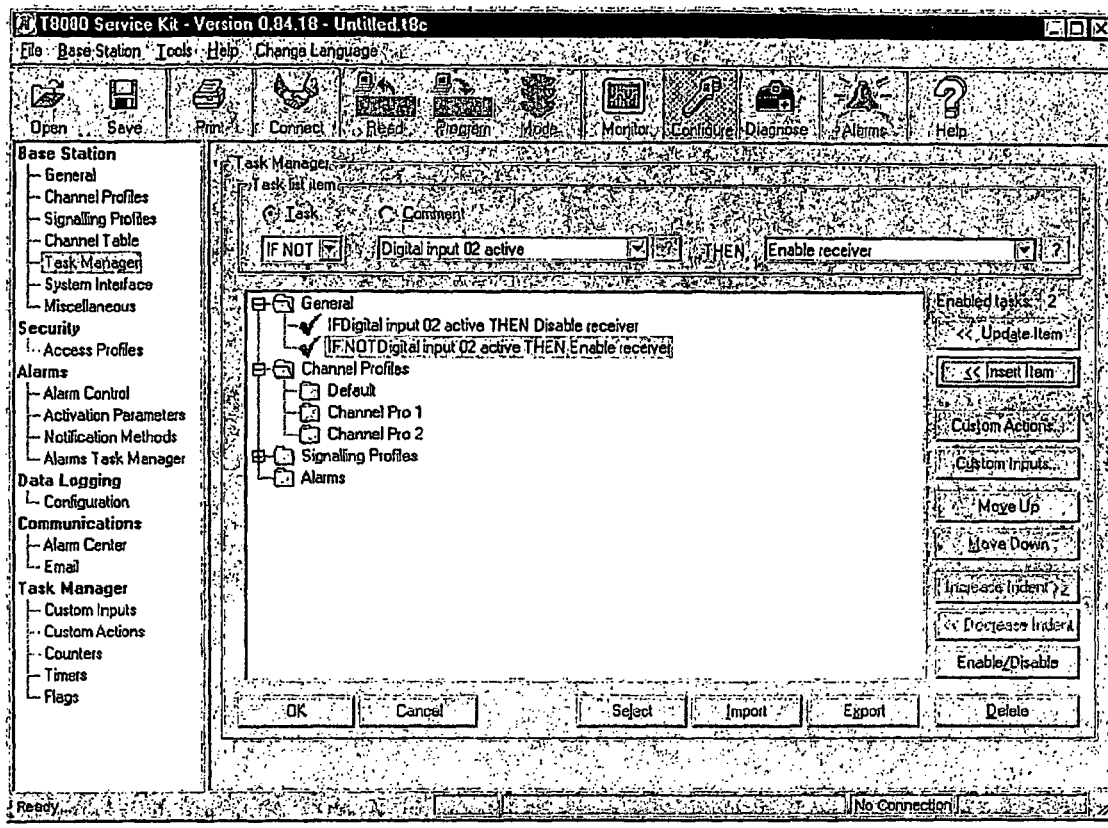
Figure 8:
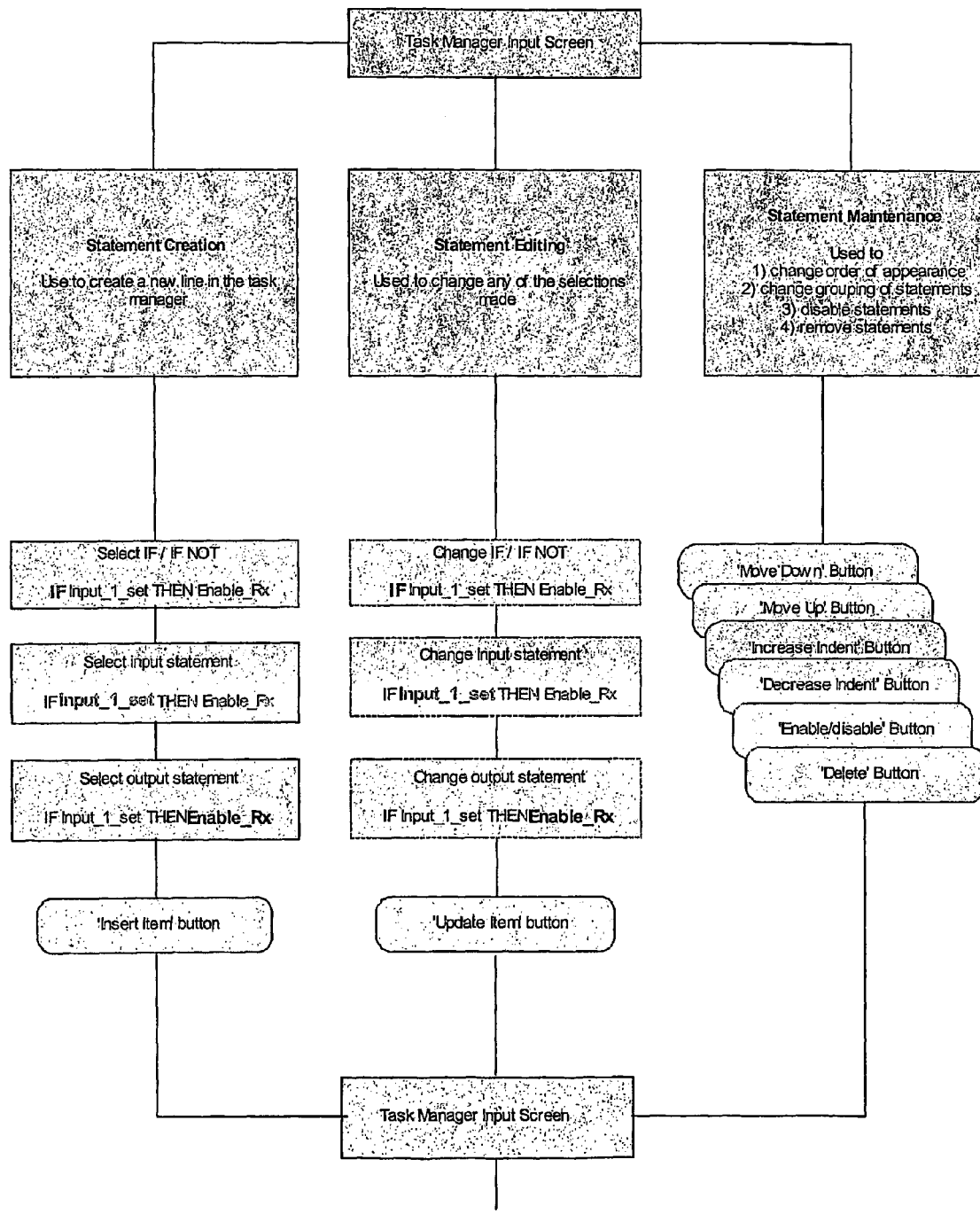
Figure 10A:
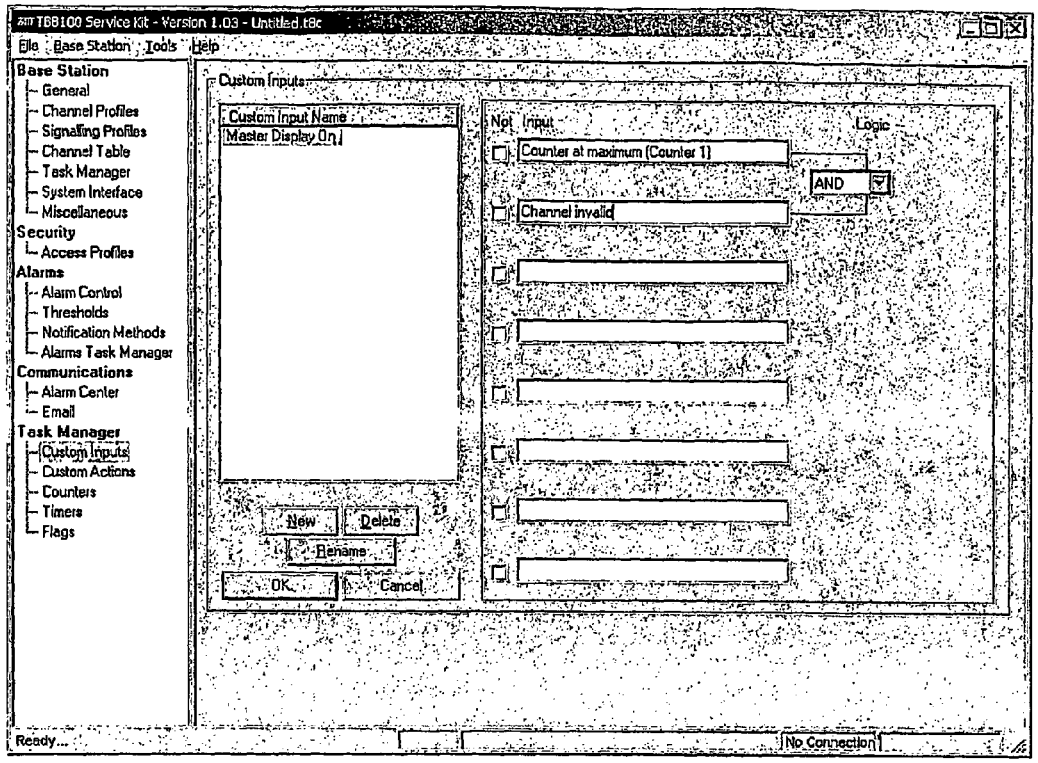
Figure 10B:
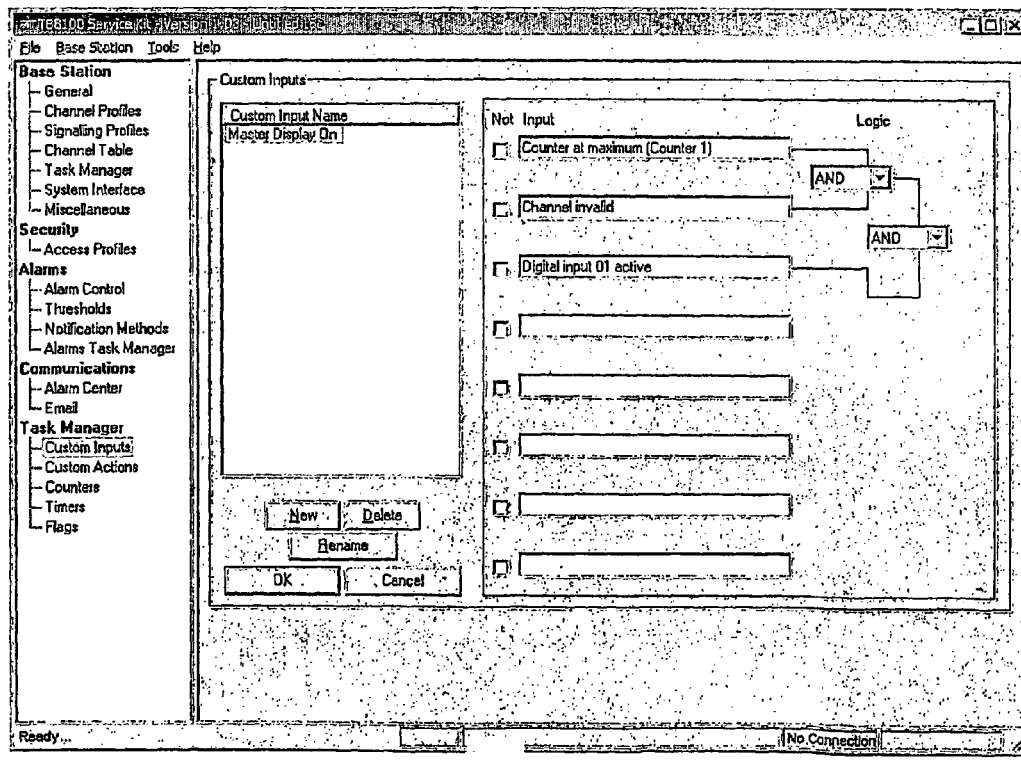
Figure 10C:
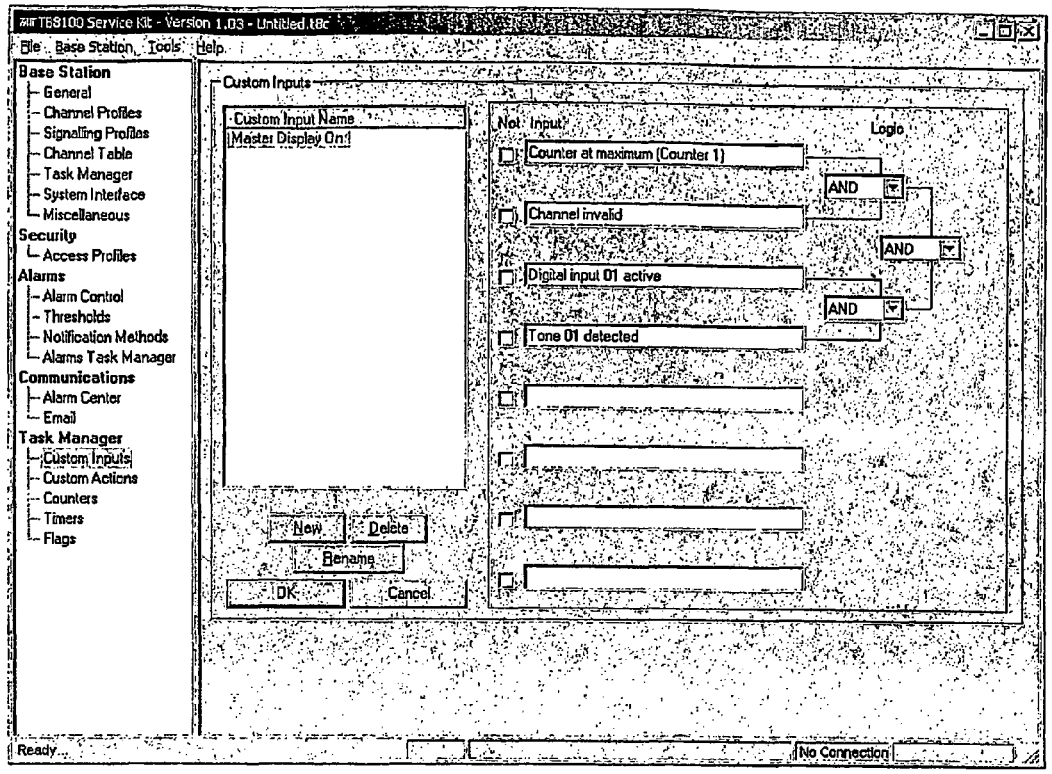
Figure 10D:
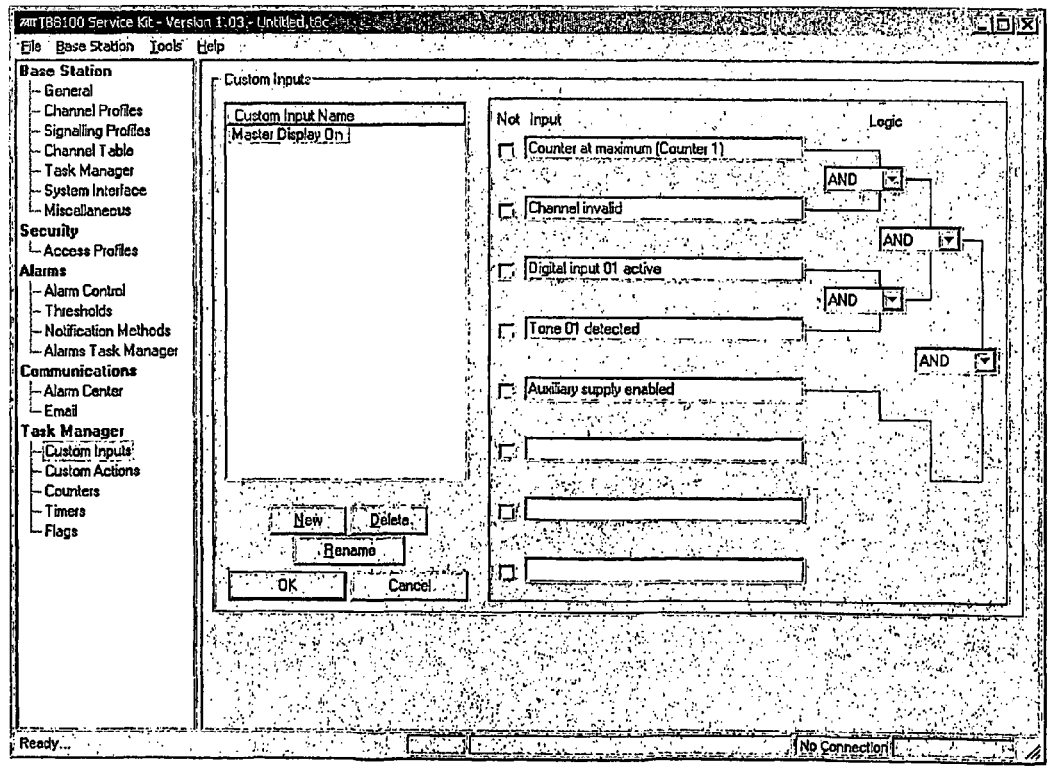
Figures 10E, 11:
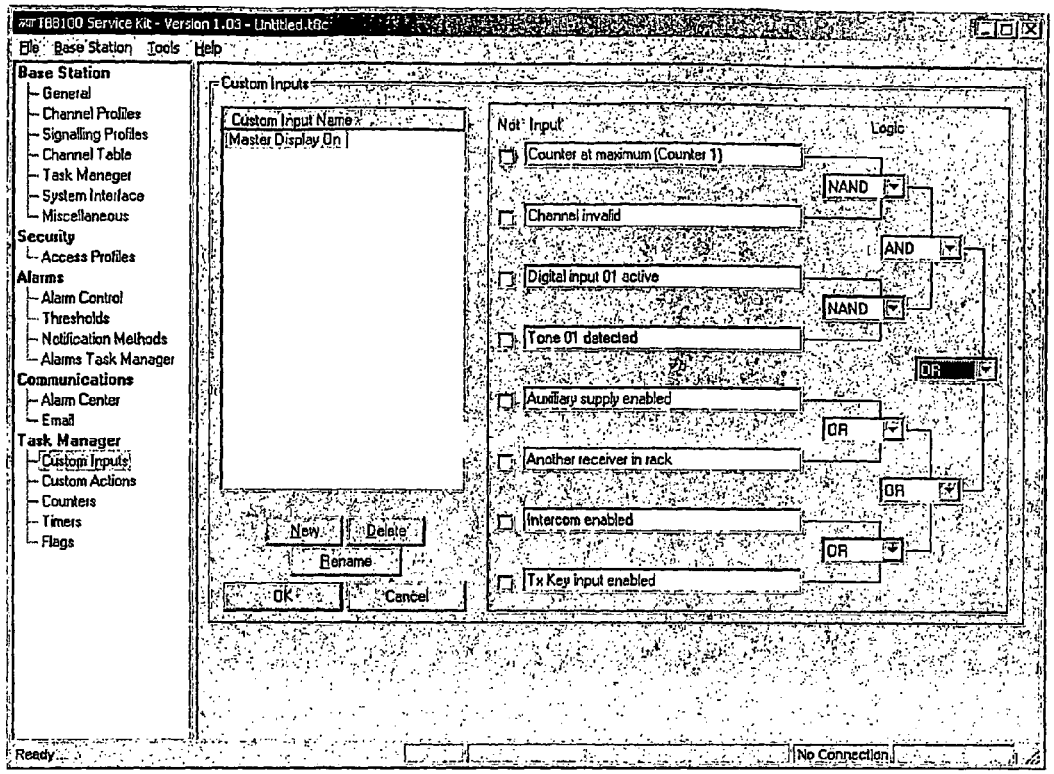
Figure 14:
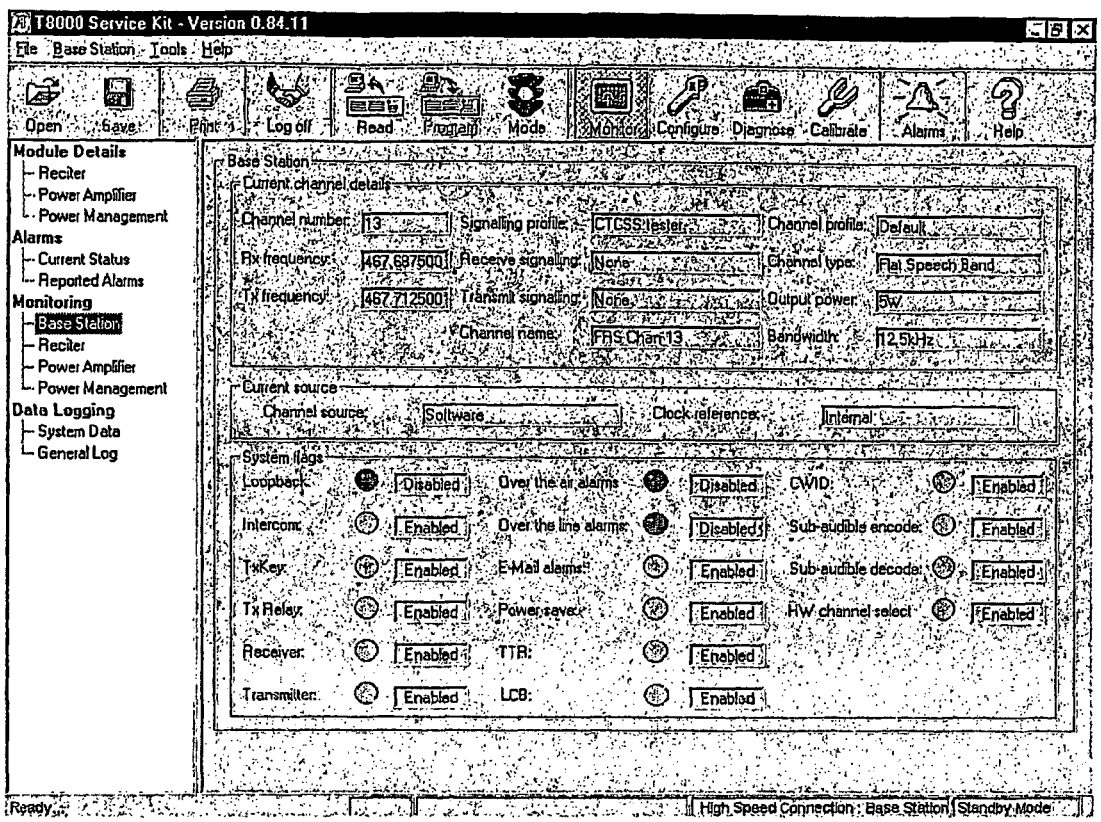
Figure 15A:
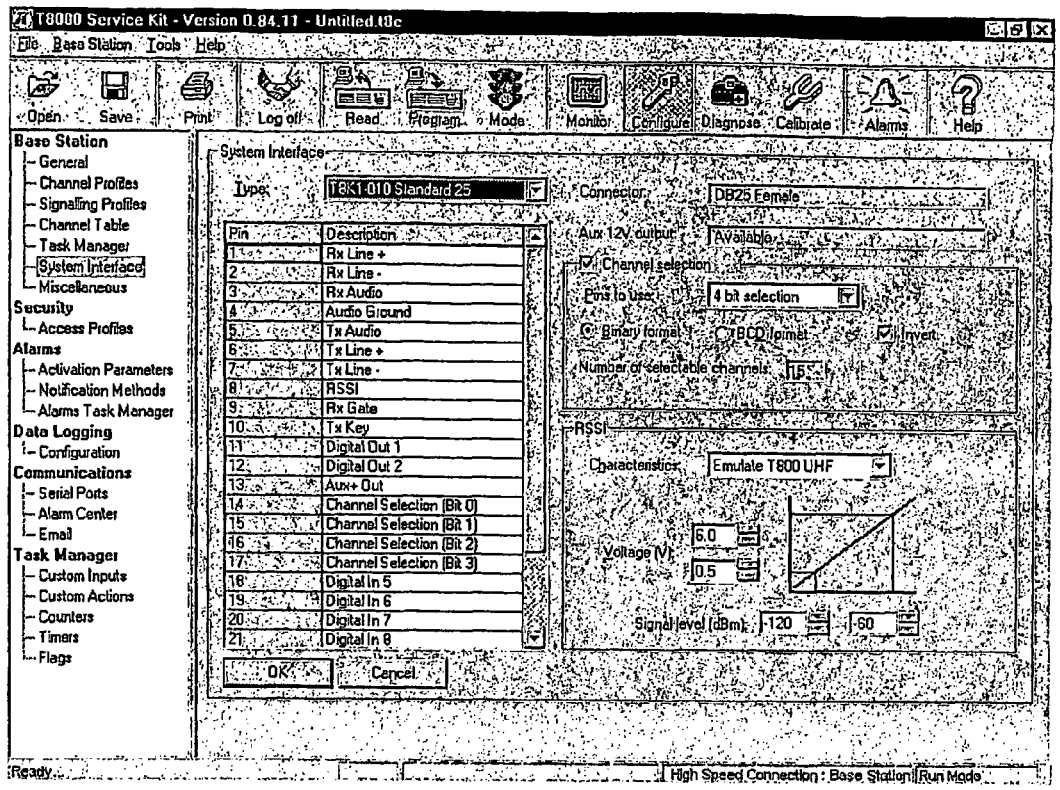
Figure 15B:
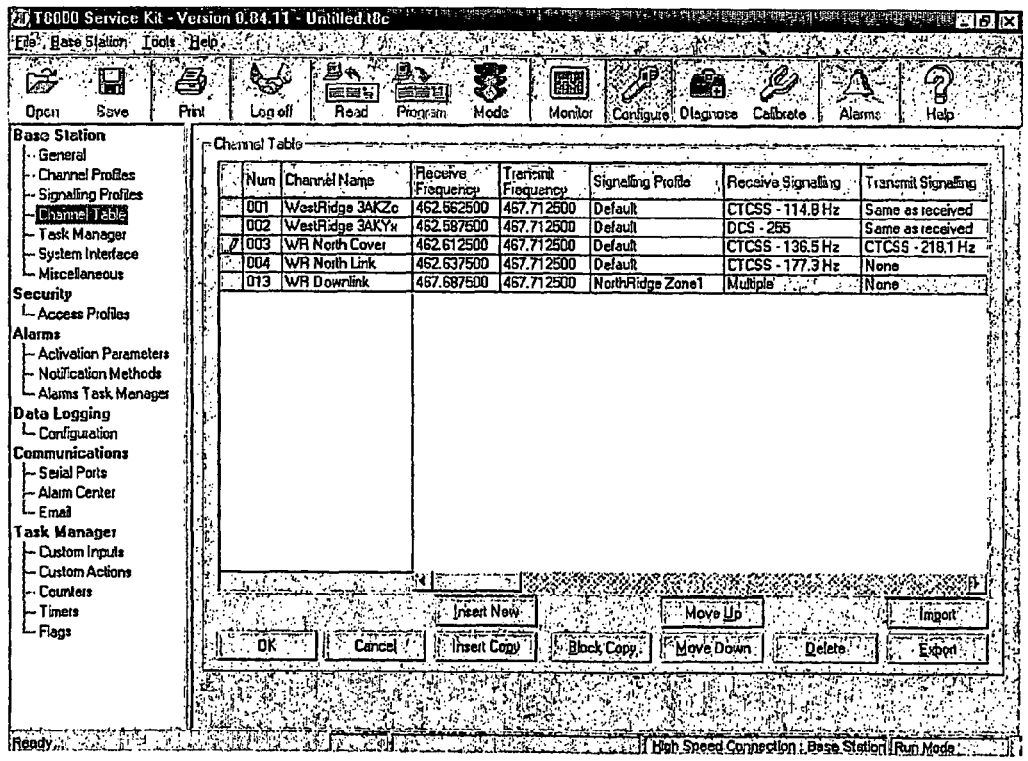
Figure 16A:
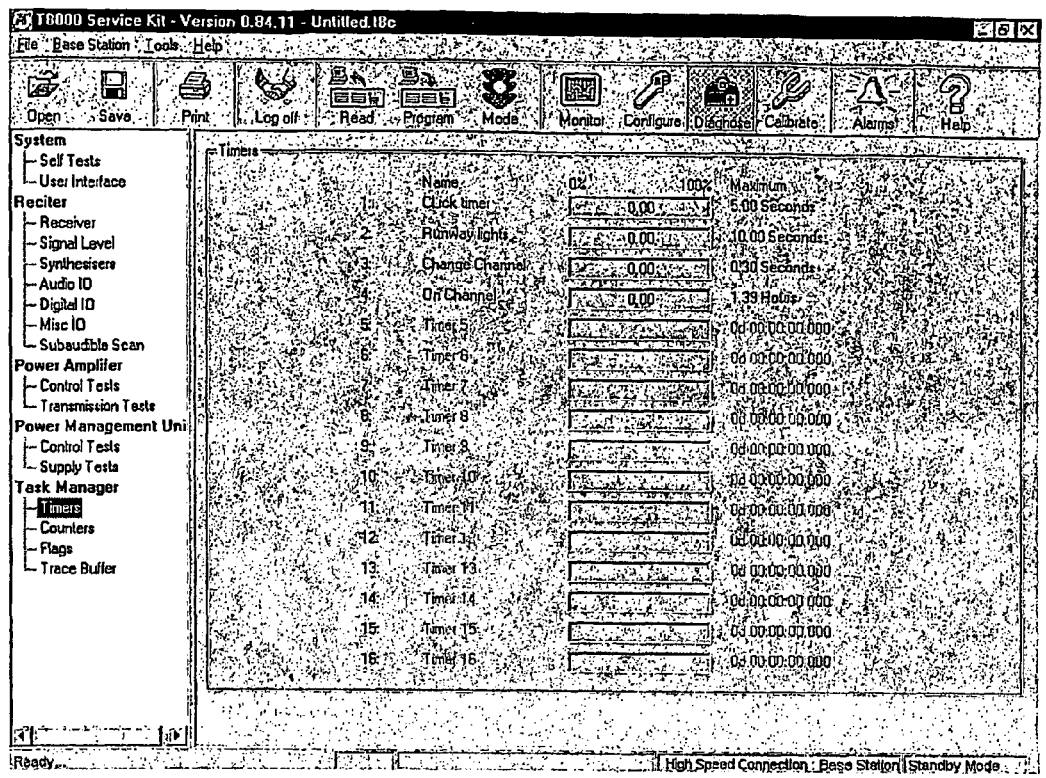
Figure 16B:
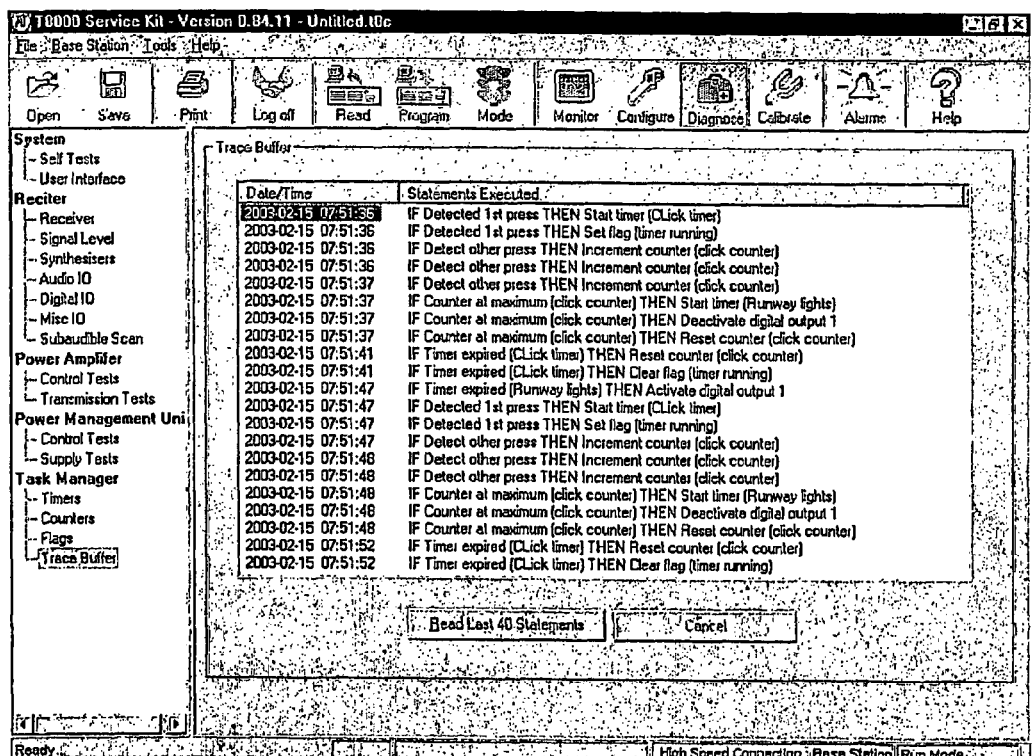
Figure 17A:
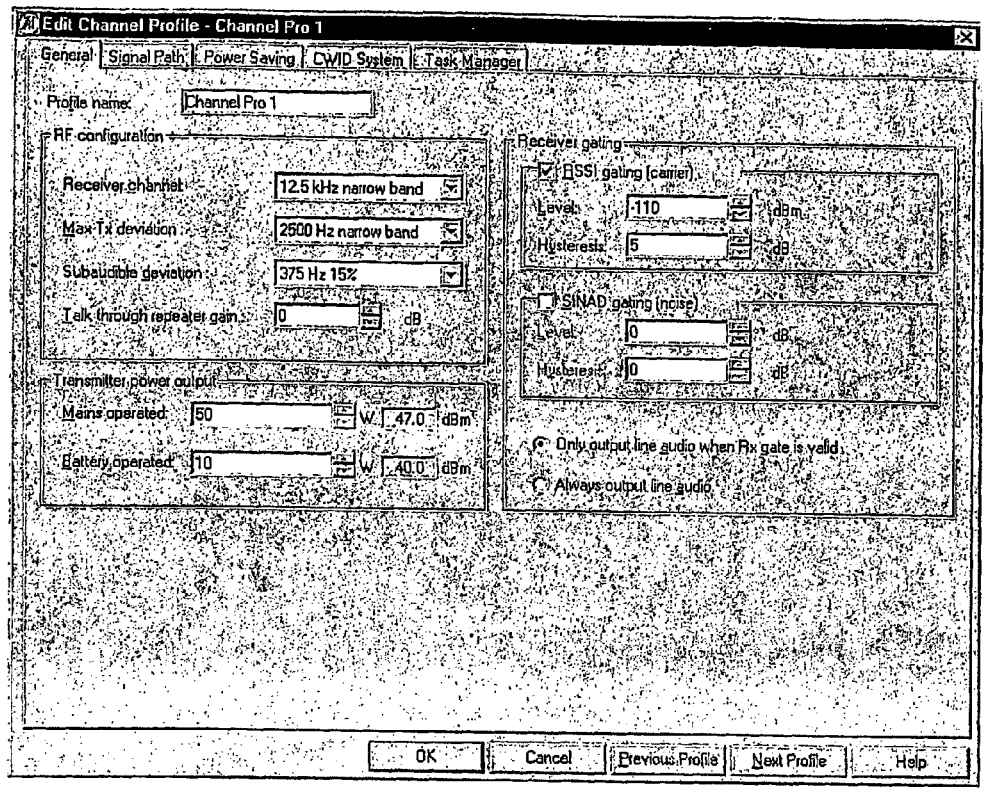
Figure 17B:
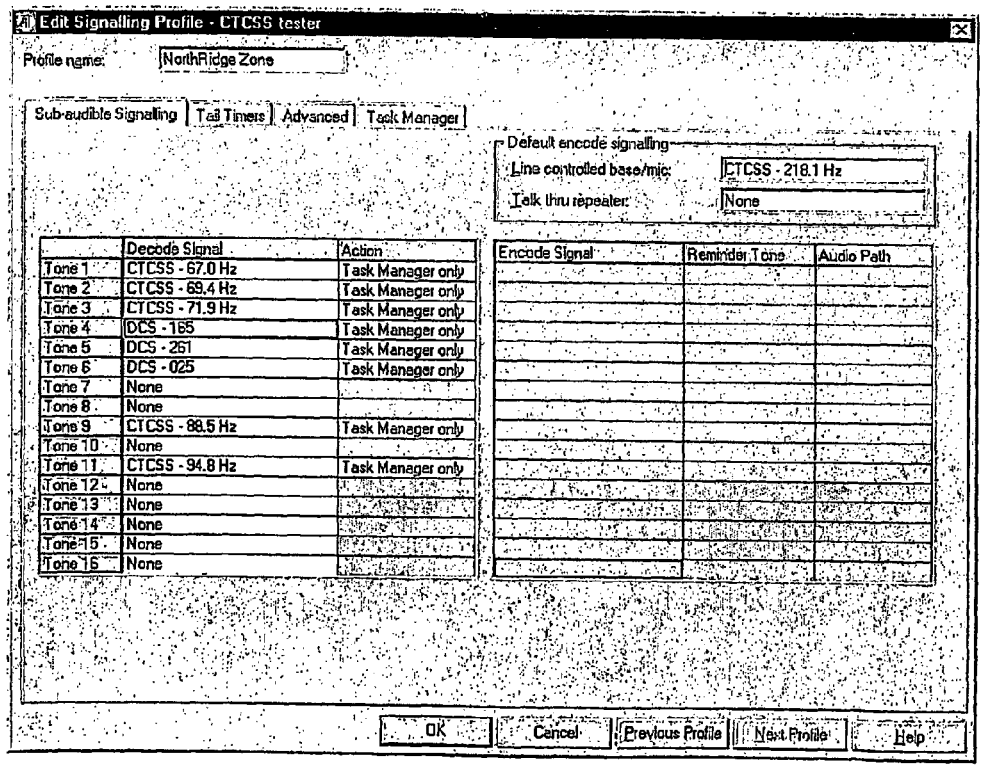

FIG. 7a indicates how an input condition is selected in the task manager,

FIG. 7b indicates how an output action is selected in the task manager,

FIG. 7c shows a completed task after selection of the input and output,

FIG. 7d outlines the main steps in creating complementary tasks,

FIG. 8 outlines overall use of the manager for programming and maintenance,

FIG. 9a summarises typical input conditions for a radio base station,

FIG. 9b summarises typical output actions for a radio base station,

FIGS. 10a-10e show steps in creating a logic statement for a task,

FIG. 11 summarises typical logic relationships between two inputs,

FIG. 12 lists input and output statements for a number of example tasks,

FIGS. 13a-13e indicates user steps when programming a more complex task,

FIG. 14 is a typical monitoring screen for the service kit,

FIGS. 15a and 15b are typical configuration screens for the kit,

FIGS. 16a and 16b are typical diagnostic screens for the kit,

FIGS. 17a and 17b are typical editing screens for the kit,

FIGS. 18a-18d are screens indicating graphical management of backplane connections in the station, and FIG. 19 shows tasks for switching the station between predetermined channels according to detection of speech or data signals.

DESCRIPTION OF PREFERRED EMBODIMENTS

Referring to the drawings it will be appreciated that the invention may be implemented in a range of different ways for different kinds of equipment in a communication network. This specification describes management of a base station used in a mobile radio network that is manufactured by Tait Electronics in New Zealand, as an example only. Adaptation of the invention for equipment produced by other manufacturers is readily made. It is assumed that the operation of a mobile network is known to a skilled reader and that details of the network operation and specific components of the network such as base stations need not be given here.

Figure 1:
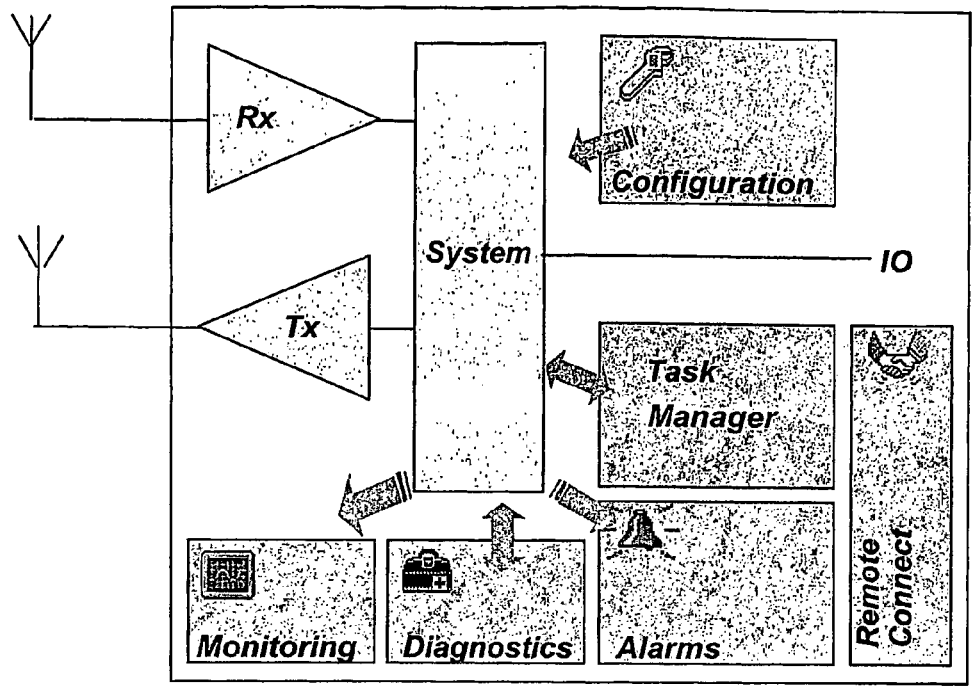

FIG. 1 is a schematic indication of hardware and software components in the base station. The usual combination of electronic components such as a microprocessor, memory, data and bus connections are represented together as a central system, with transmitter and receiver components Tx and Rx having respective antennas. A range of general IO connections are usually available to the system such as balanced and unbalanced lines, digital inputs and outputs, RxGate and TxKey, coaxial relay, RS232 and Ethernet ports. Software applications in the station typically include configuration, monitoring, diagnostics, alarms, and a range of remote connection routines. A task manager component is also provided to enable non-standard functions according to special requirements of the station operator.

Figure 2:
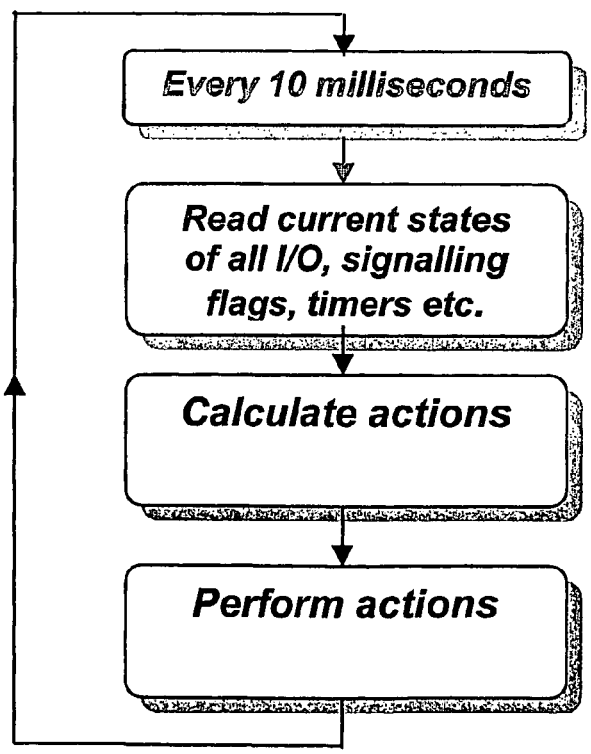

FIG. 2 outlines the overall operation of a task manager in the base station of FIG. 1. The current state of the station is determined at repeating intervals, typically of about 10 ms, but could also be driven by interrupt activity. This includes a determination of all IO, signalling flags, timers, and so on. Tasks required by the manager are then carried out according to the programmed requirements, using the determination of state to test input conditions and trigger output actions when appropriate. A range of tasks are indicated in FIG. 12 by way of example. Provision of a graphical interface to enable creation and editing of the statements used to program these tasks is an enhanced feature described below.

Figure 3:
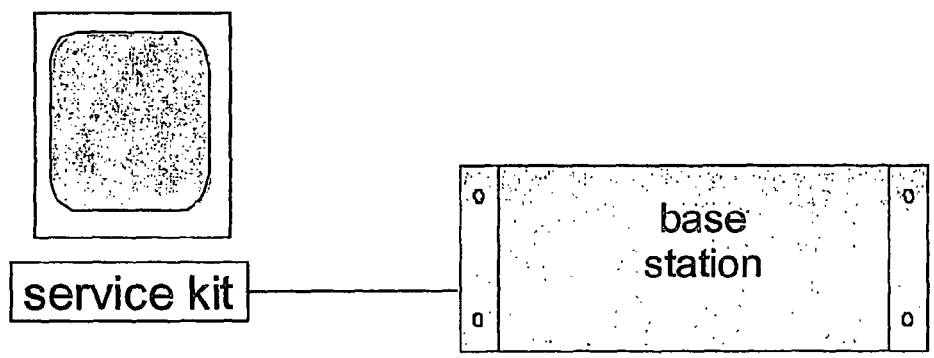

FIG. 3 indicates a service kit for set up and maintenance of the routines in the base station. It may be provided as a software application and accessed in the station directly, or stored separately in another computer device such as a laptop that is connected to the station when required. Connection may take place in a variety of ways such as direct cable, dialup modem, radio modem or through third party equipment. New functions required by the operator are generally created using the service kit and stored in the station memory for execution by the microprocessor.

Figure 4:
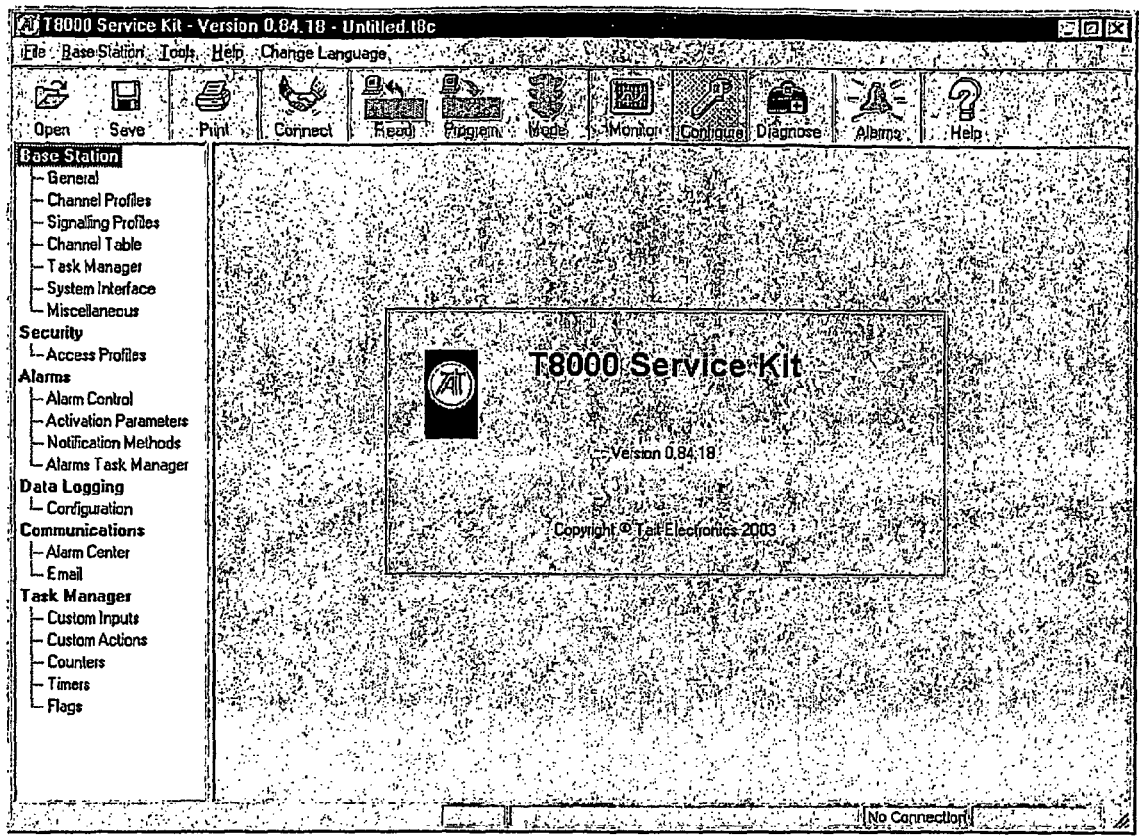

FIG. 4 is the main configuration screen of a service kit that has been developed at Tait Electronics in New Zealand, for base stations known as the TB8100 (part of the T8000 series) by way of example. It is typically enabled by software in a laptop carried by a technician who programs a base station, as indicated in FIG. 3. Details of the construction and operation of a graphical user interface will be understood by a skilled reader and need not be reproduced here. A set of primary control buttons for access to service functions including monitoring, configuration, diagnostics and alarms are visible in the menu across the top of the screen. The interface as shown is currently set for access to configuration aspects of the kit. Access to various configuration functions including the task manager is also visible in the menu down the left hand side of the screen.

Figure 5:
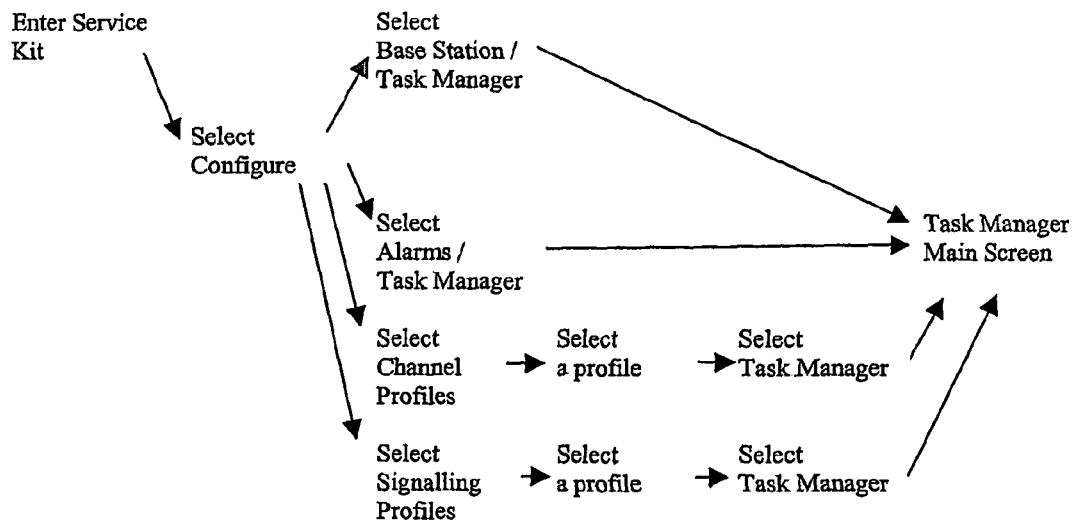

FIG. 5 outlines accessibility of the task manager interface in the service kit. It can be seen that the task manager screen is readily accessible from any of the main screens that are available to a user for management of a base station. In this example a user can proceed to the task manager screen from any of the main configuration features of the service kit, namely alarms, channel profiles and signalling profiles in this example. The ease of access and use of a discrete task manager function are in marked contrast to the programming options offered by prior systems.

Figure 6A:
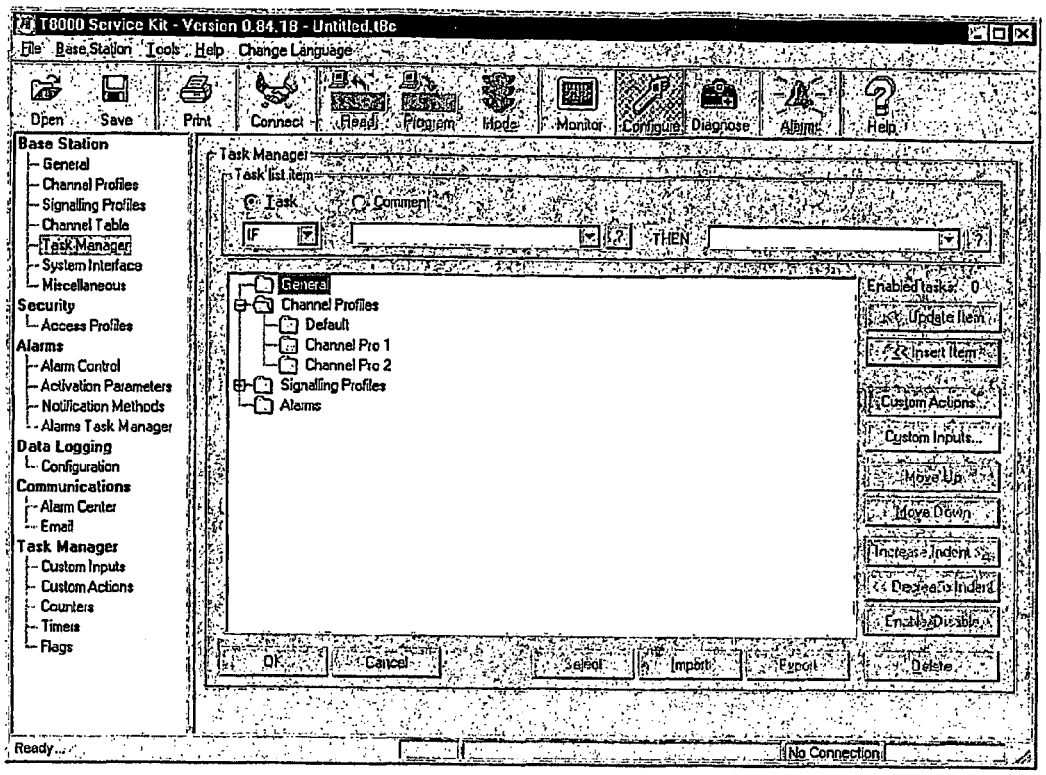
FIG. 6a is the main screen of the task manager ready for input of new tasks.

FIG. 6a is the task manager screen as presented to a user for general tasks and for functions relating specifically to channel profiles, signalling profiles and alarms. A central frame or display region contains an expandable directory structure through which the programming statements relating to the current tasks may be accessed. This frame contains a range of self explanatory controls for input and editing of programmed functions, and for other general functions that are commonly required by a user.

Figure 6B:
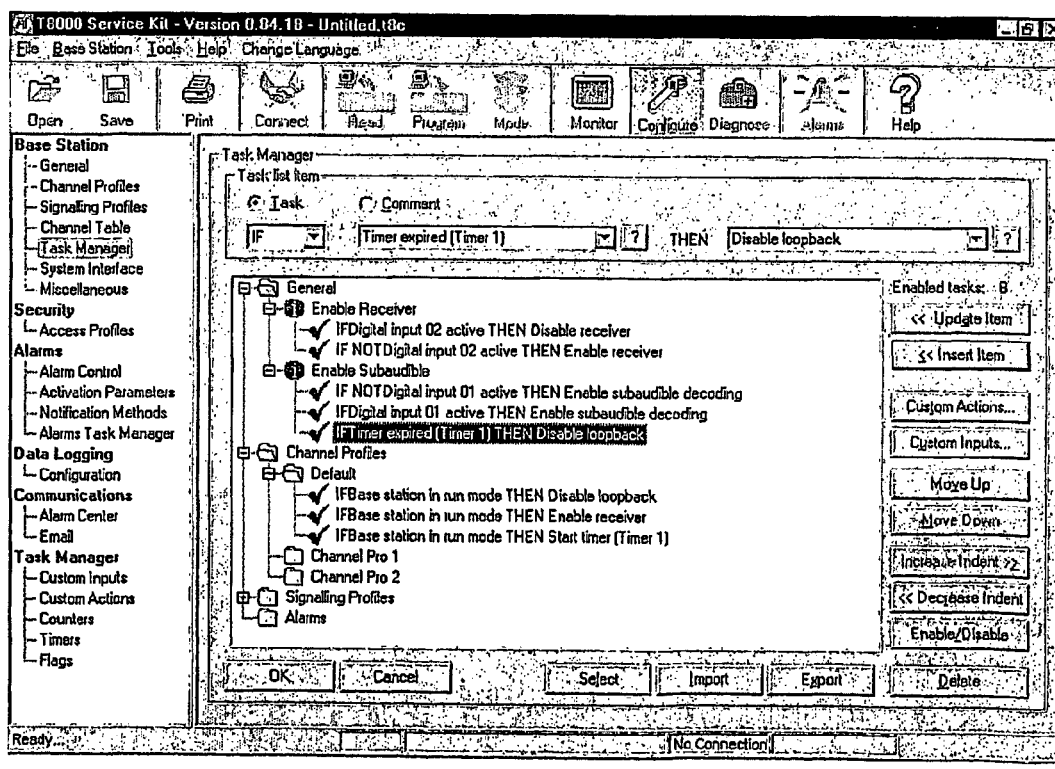
FIG. 6b shows how multiple tasks may be viewed on a single screen

FIG. 6b shows a partial expansion of the directory structure from FIG. 6a in the central display region, and indicates a number of specific tasks. In the "general" directory for example, tasks entitled "enable receiver" relating to "digital input 02", and "enable subaudible" relating to "digital input 01" and "timer 1" are indicated in full. Tasks are generally programmed on the screen by selecting input conditions and corresponding output actions through predetermined lists that may include customised conditions and actions. Descriptive comments may be added as indicated by the marker "i", and other user features such as a scroll function may be provided.

Each task is preferably programmed in the Boolean format—"IF input condition THEN output action", where the conditions and actions are selected from drop down menus, and may be preceded by a NOT operator if required. The logic operators "IF" and "IF NOT" are also be selected from drop down menus, and more general options could be provided if required. A component task from "enable subaudible" is highlighted by way of example, in which the test condition is "timer expired" and the consequent action is "disable loopback". A range controls and formats are possible in this interface to provide the user with an equivalent ease of programming.

FIGS. 7a, 7b, 7c and 7d show how a simple task relating to operation of the receiver hardware may be created, with the receiver being enabled or disabled depending on the status of "digital input 02". In FIG. 7a the initial operator "IF" has been selected and an input condition is then selected from a series of drop down menus that present a range of 16 accessible digital inputs to the base station. In FIG. 7b the output action is selected from a range of three possible states of the receiver, to complete a simple programming statement. In FIG. 7c both this statement and a complementary negative statement have been created. The latter has been highlighted and may be edited or rearranged in the directory structure if required. FIG. 7d summarises the simple sequence of user steps that are required to enter the two components of the overall task.

FIG. 8 summarises operation of the task manager screen as shown in FIGS. 6a and 6b of the service kit. Creation, editing and maintenance of program statements are the three main aspects of operation. Statement creation involves selection of a general logic structure for the statement, with the options being "IF" and "IF NOT" in this example. The input test and output action are then selected and included in the statement. Once the programmer is satisfied with the statement it can be confirmed and inserted within the overall list of functions that are stored in station memory. Similarly statement editing involves possible changes to the logic structure and either of the input test or output action. Once edited the statement can be confirmed and updated in the station memory. Maintenance allows the arrangement and appearance of the statements on the screen to be adjusted, by way of functions such as "move down", "move up" and so on which can be seen as button controls on the right hand side in FIGS. 6a and 6b.

FIGS. 9a and 9b list substantially all of the main input conditions and output actions that are currently intended for the task manager as described above. A range of counters, timers and flags are also usually available, and custom input and output statements may also be created by users. The conditions and actions have a number of general classifications according to the feature for which they are most commonly used in the base station. The detailed nature of the individual items is not important although the ease of use which is enabled by an interface of this kind will be appreciated.

FIGS. 10a to 10e indicate how a relatively complex custom statement may be created graphically from primitive Boolean logic combiners. A complex input statement entitled "Master Display On" is created in this example, from eight basic components which is the maximum typically expected in the particular base station. A frame listing titles of existing custom statements is presented, with a subframe containing slots for inputs. Drop down menus containing combiners are generated as the subframe is filled by the user. In FIG. 10a, two inputs have been stated and a combiner menu containing "AND" as the default has been generated. In FIG. 10b another input has been added with a corresponding combiner menu. More inputs and combiners are added in FIGS. 10c and 10d. The full statement is shown in FIG. 10e and the combiners required to implement the particular logic have been selected.

FIGS. 10a to 10e demonstrate a predetermined formula and layout for creating complex input statements. The general formula is [(A+B)+(C+D)]+[(E+F)+(G+H)] for inputs A to H, with the available "+" operators being logical AND, OR, NAND, NOR, XOR or XNOR in this case. It will be appreciated that a range of different formula and layouts can be provided for particular purposes. Similar options are available to the user for creating custom output statements.

FIG. 11 shows the range of possible logic combinations that are provided for each pair of inputs in this example. The terms "active" and "inactive" may correspond to "high" and "low", "1" and "0" and so on, depending on the particular system.

FIG. 12 indicates a number of typical tasks by way of example. These include specific Input/Output actions, alarms and backplane control functions. The nature of these particular actions is not important and they will be self explanatory to a skilled person. The backplane example is a single relatively complex task that converts the base station from line controlled status to a talk through repeater if the line to the station fails.

Also shown in FIG. 12 is a mini application that has been created especially to control runway lights at an airport in response to radio commands. This application has been built from sequential programming steps to suit the needs of a particular user at an airport without full time traffic control. To turn on the runway lights, a pilot makes three PTT (push-to-talk) presses within two seconds on a mobile radio unit carried by the aircraft. After an hour the lights go out. The conditions and actions include options selected from the counters, timers and flags that are available via the main task manager menu.

Figure 13A:
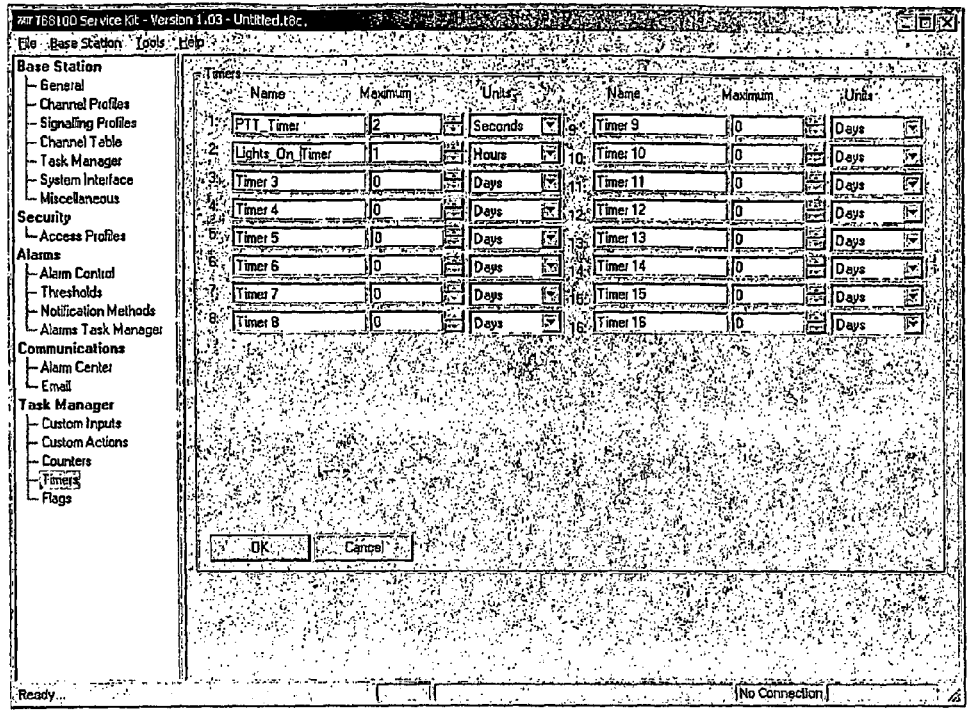
Figure 13B:
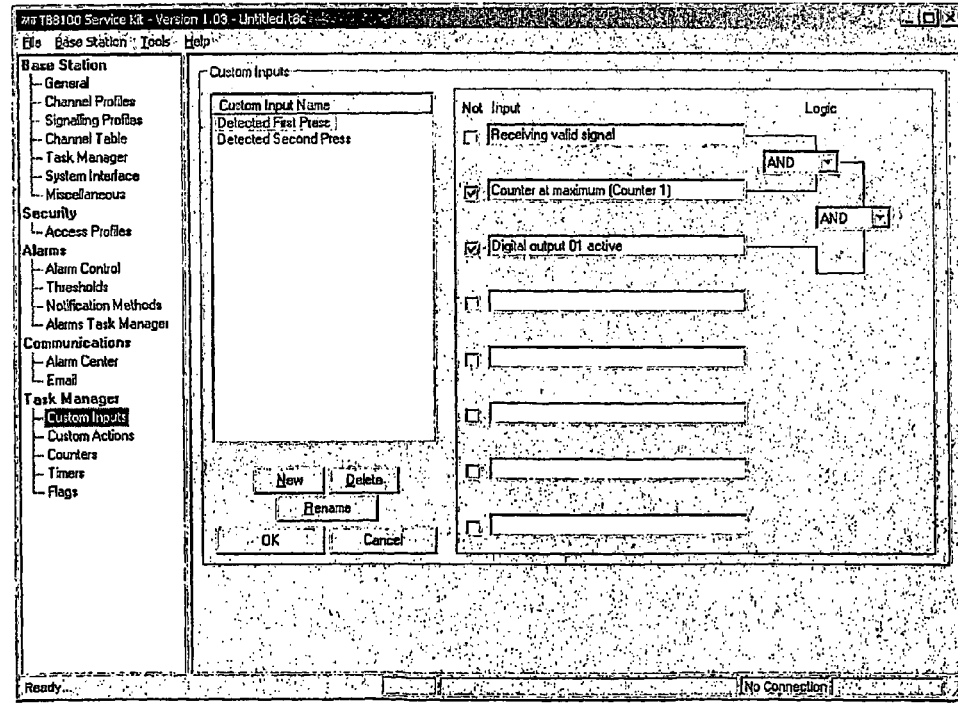
Figure 13C:
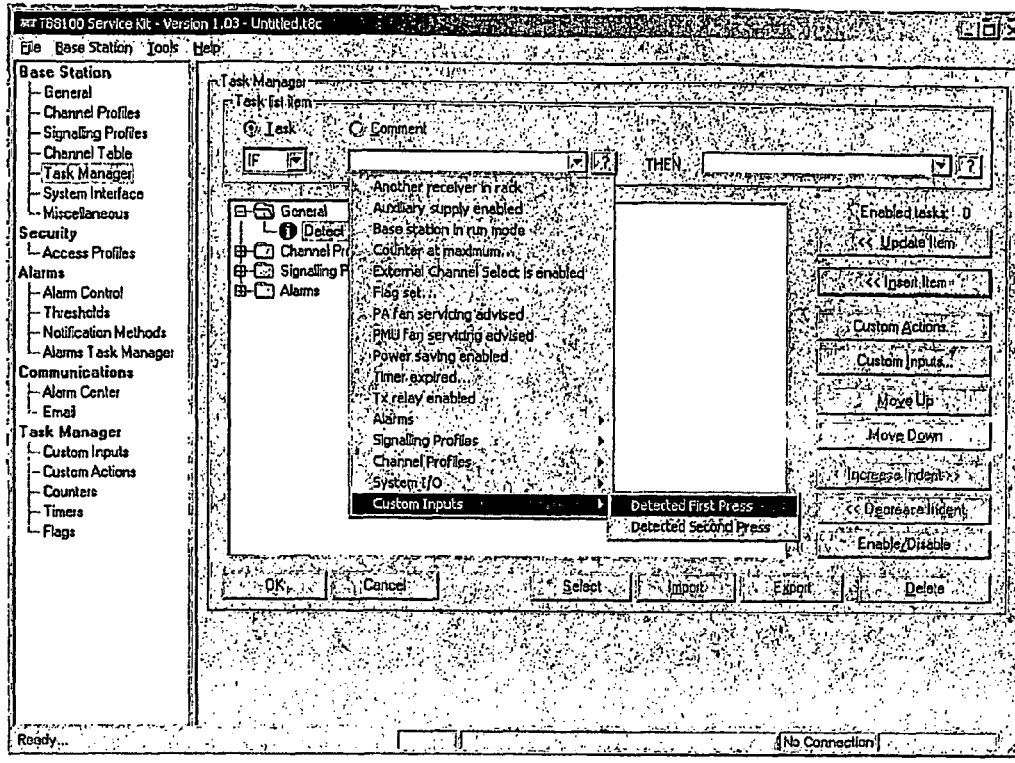
Figure 13D:
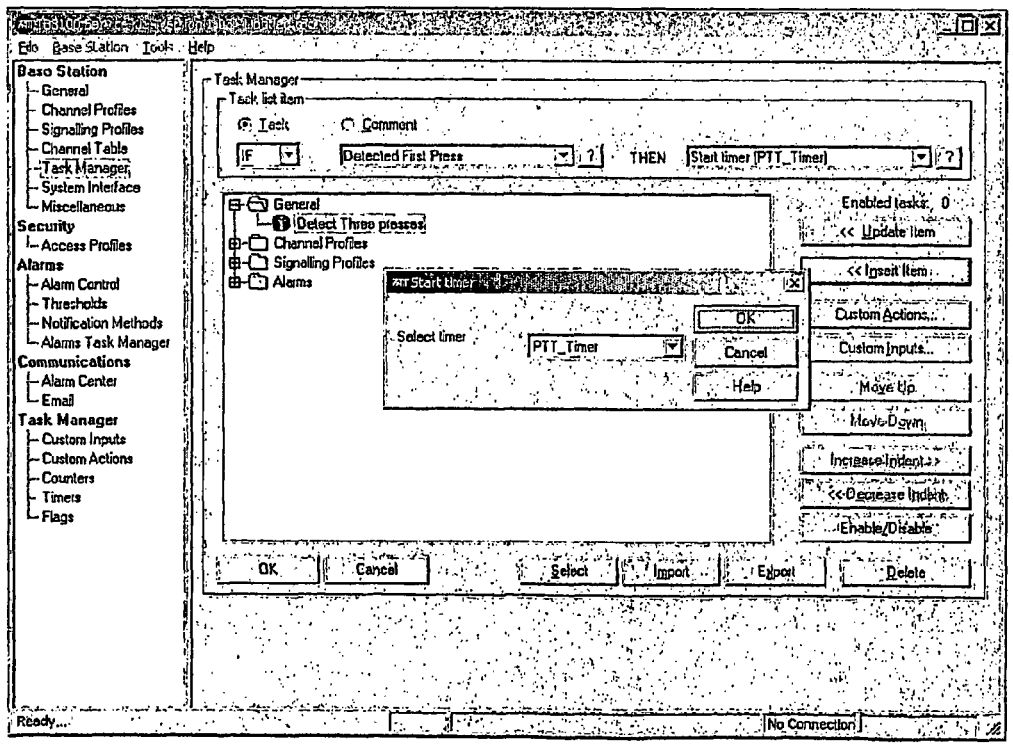
Figure 13E:
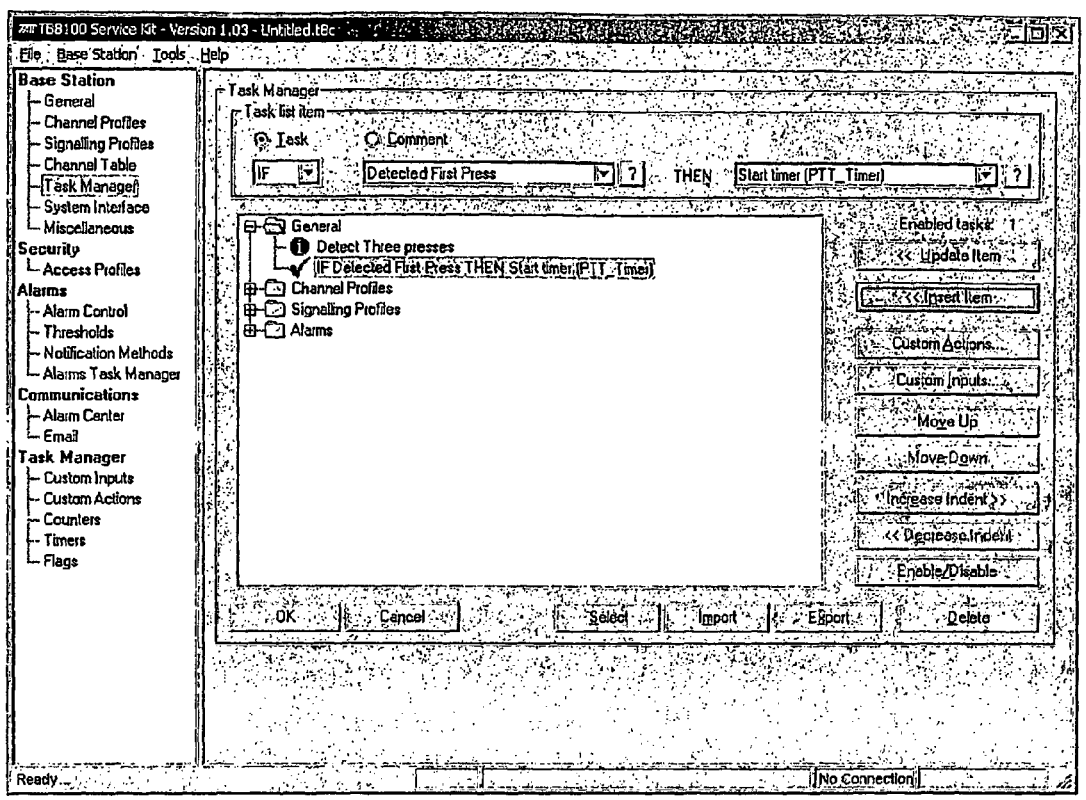

FIGS. 13a to 13e show how the first line of the mini application in FIG. 12 may be created in the task manager. Two timers "PTT_Timer" and "Lights_On_Timer" are first defined in FIG. 13a. Two custom inputs "Detected First Press" and "Detected Second Press" are then created in FIG. 13b, using a small part of the general formula and layout explained above. In FIGS. 13c and 13d, a new "IF" "THEN" statement is created using "Detected First Press" to start "PTT_Timer". The line is finished and inserted in the directory structure in FIG. 13e. In general, flags, timers, counters and custom inputs all appear in the normal menu structure of the task manager, as also indicated in FIGS. 7a and 7b. Similarly for the outputs such as set or clear flag, start or stop timer, increment, decrement or reset counter, and custom outputs.

FIG. 14 shows a monitor screen indicating the general state of the base station, including details of the current channel and a range of system flags. Other aspects of the station such as the transmitter, power amplifier and power management may also be monitored. For purposes of the monitor, a central frame or display region contains a number of data boxes and operational indicators. This frame presents a range of details that are self explanatory and commonly of interest to a skilled user.

FIGS. 15a and 15b are screens showing other configuration aspects of the station. The system interface presents pinout wiring information and an option to select the input lines that are to be used for channel control or as inputs to the task manager. An output profile for the RSSI (Received Signal Strength Indication) can also be set. The channel table enables parameters to be programmed on a channel by channel basis, with separate channel and signalling profiles. In a typical station there might be 255 channels each with 16 possible channel profiles and 16 possible signalling profiles, for example.

FIGS. 16a and 16b show diagnostic screens of the service kit, again as examples. They generally provide access to the current state of timers, counters, flags and a trace buffer. Information of this kind can be helpful to a user debugging an application, for example.

FIGS. 17a and 17b show edit screens for channel and signalling profiles respectively. Aspects of "Channel Profile 1" include details of a number of standard items such as RF configuration, Transmitter power output and Receiver gating. For signalling profiles up to 16 DCS or CTCSS tones can be configured at one time in this example. These can be used for gating of the receiver in the usual way, or as inputs to the task manager. It can be seen that the task manager is readily accessible from each of these screens.

FIGS. 18 and 19 indicate further how overall operation of the base station can be determined by the task manager using software rather than hardware modifications. FIGS. 18a-d show the principle paths for receiver and transmitter signals between the antenna and various IO ports in various configurations. A range of different filters and other characteristics can be set in each path. The station is able to relay normal pre-emphasised speech on some occasions and full band data on others. The speech signals are always sent with a CTCSS tone, while data messages have no CTCSS tone but occupy the whole band. Path A is set up as a speech repeater with an audio profile set for pre-emphasis. Path B is set up as a data repeater with an audio profile set for full band flat data. FIG. 19 presents custom tasks that can be used to switch between paths in response to detection of data or speech.

Figure 18A:
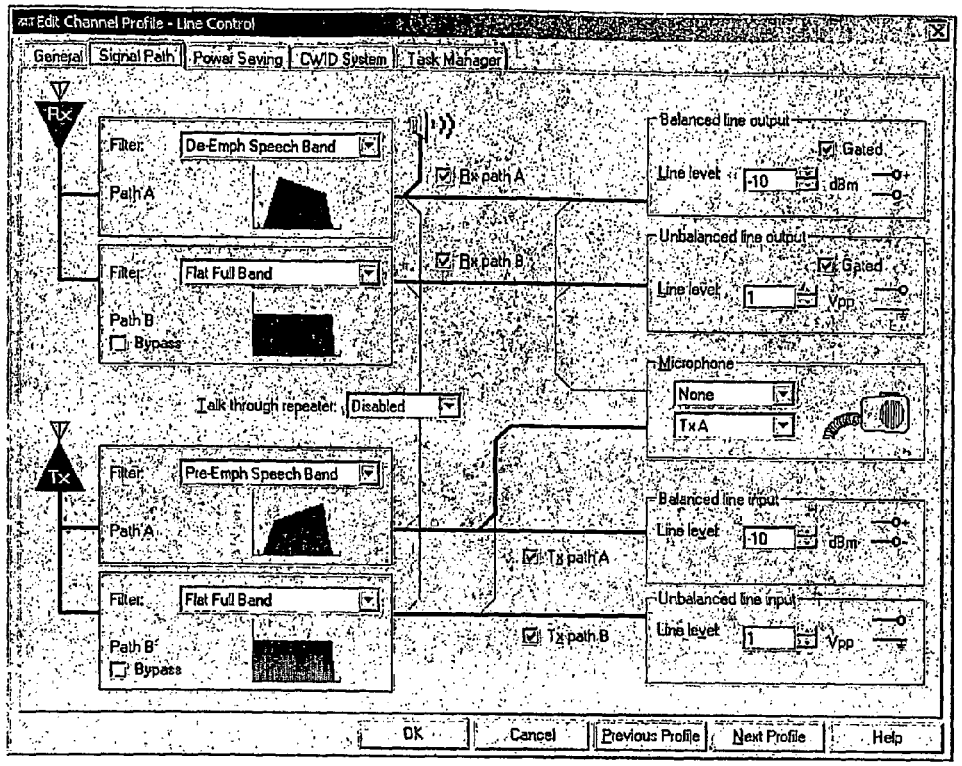

In FIG. 18a, the station operates under line control with speech and data signals from a land line passing through to the transmitter Tx from right to left. Signals at the receiver Rx pass through to the land line from left to right. Speech from the microphone enters path A to the transmitter while speech for the speaker exits path A from the receiver. Output actions in FIG. 9b can be used to override this arrangement for various purposes. For example: "Disable Receiver" will stop the receiver Rx, "Disable Transmitter" will stop the transmitter Tx, "Disable TxKey" will stop line transmissions while allowing other transmissions such as microphone and test signals, "Disable Line Controlled Base" will effectively cut the four wires that cross the screen, during a warm standby operation for example, and "Enable Loopback" will wire the line inputs to the line outputs for installation and commissioning of the station.

Figure 18B:
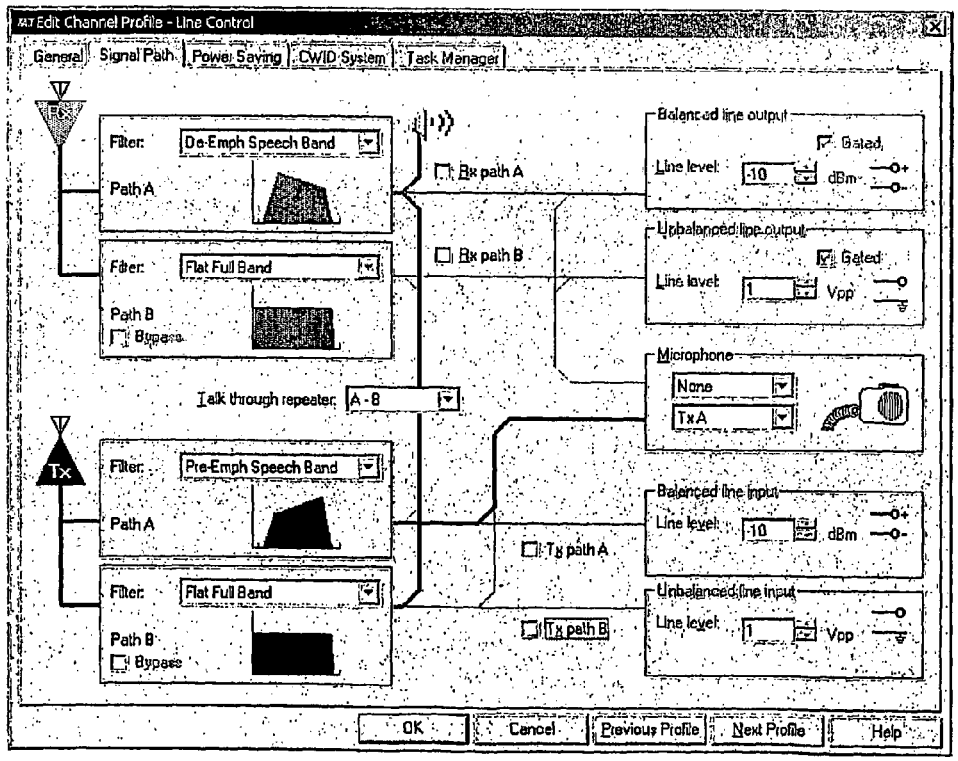

If FIG. 18b, the station is configured as a talk through repeater, using Path A for transmission of microphone signals and Path B for transmission of receiver signals. Signals at the receiver Rx are passed directly to the transmitter Tx while the lines in and out will not operate. Various commands are effective, such as "Disable Talk Through Repeater" which disconnects the line Rx to Tx.

Figure 18C:
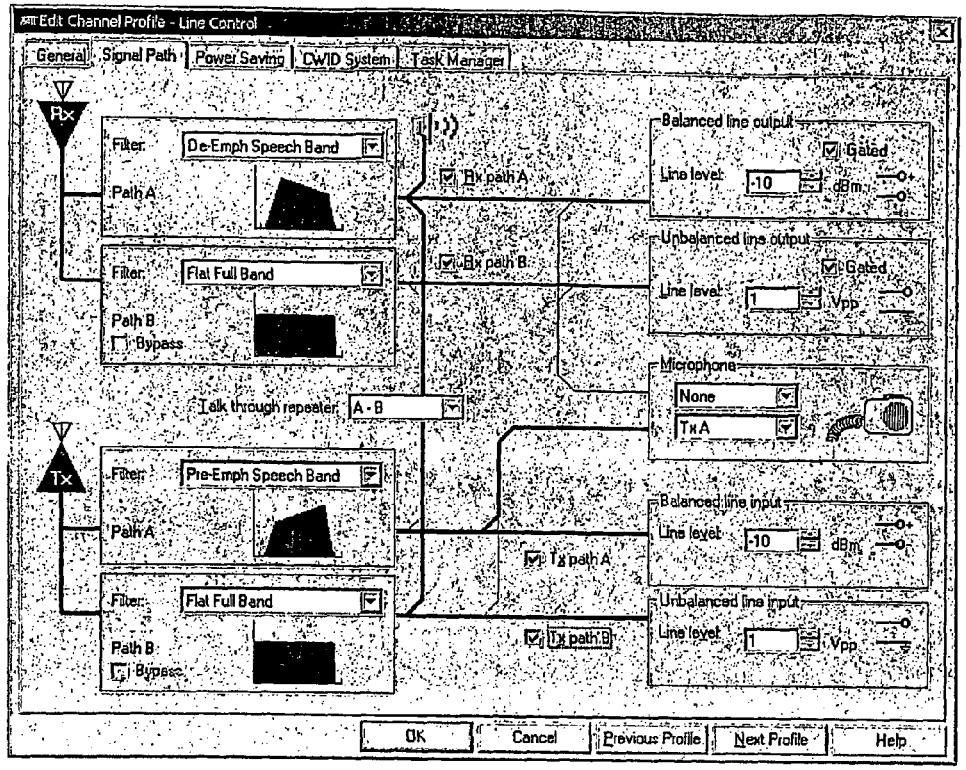

In FIG. 18c, the station is wired with all paths fully on. It can be converted to a line controlled base by two statements: "IF Base station in run mode THEN Disable Talk through Repeater" in conjunction with "IF Base station in run mode THEN Enable Line Controlled Base". If the line fails then the station can be switched to repeater mode: "IF Line level low THEN Enable Talk through Repeater" and "IF Line level low THEN Disable Line Controlled Base". When the line is restored the station can be switched back again: "IF NOT Line level low THEN Disable Talk through Repeater" and "IF NOT Line level low THEN Enable Line Controlled Base".

Figure 18D:
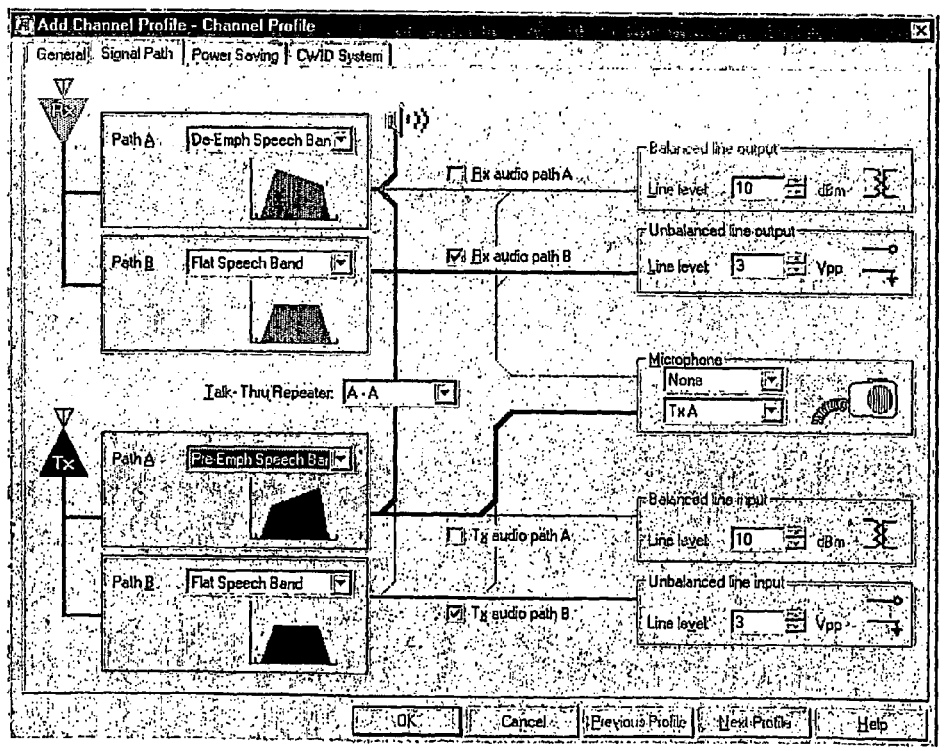

FIG. 18d is another configuration given by way of example, in which the station operates as a talk through repeater with line control for data purposes.

Much of the behaviour described above is traditionally done by custom wiring of backplanes and by creating specialised circuit boards for those backplanes. A task manager according to the present invention can largely remove the need for a backplane or for any external control circuitry.

The invention claimed is:

1. A task management system for a radio station, including:
a processor; and
a memory coupled to the processor for storing instructions which when executed from the memory, cause the processor to
display a display region containing a list of user created programmed functions of a radio station in a mobile radio network,
display a first control for user selection of an input logic condition from a list of available input logic conditions for the programmed functions,
display a second control for user selection of an output action from a list of available output actions to be carried out by the radio station, wherein the output action is performed by the ratio station if the input logic condition selected from the first control is satisfied,
display a third control for user insertion of a function created by selections using the first and second controls into the list of programmed functions, and
display at least one further control for user editing of the list of created functions, wherein the at least one further control for editing the programmed functions enables programmed functions in the list of created functions to be deleted or re-ordered in the list.

2. A task management system according to claim 1 wherein each programmed function is displayed in a form of one of "IF input condition THEN output action" and "IF NOT input condition THEN output action".

3. A task management system according to claim 1 wherein the processor periodically performs each programmed function in the list.

4. A task management system according to claim 1 wherein the first control lists substantially every available input condition of the station.

5. A task management system according to claim 1 wherein the second control lists substantially every available output action of the station.

6. A task management system according to claim 1 wherein the functions include control of station input/output, station alarms and external equipment.

7. A task management system according to claim 1 wherein the display region is presented as a task management screen which is accessible by a user directly from screens for configuration of radio channel profiles, signaling or alarms.

8. A task management system according to claim 1 which is a radio base station, a mobile radio station, or service apparatus for a radio station.

9. A computer-implemented method of enabling management of a radio station, including:
presenting a user with a graphical user interface (GUI) including a task management GUI;
receiving a selection of an input logic condition from a first control of the task management GUI which provides a list of available logic conditions on the management GUI;
receiving a selection of an output action to follow the input logic condition from a second control of the task management GUI which provides a list of available output actions on the management screen, wherein the output action selected from the second control is carried out by the radio station in a mobile radio network if the input logic condition selected from the first control is satisfied;
receiving a selection of a creation command from a third control on the management GUI, after the input condition and the output action have been selected using the first and second controls;
displaying the selected input logic condition and the selected output action on the task management GUI as a created programming function; and
storing the programming function as part of a list of created functions for execution by the radio station; and
display at least one further control for user editing of the list of created functions, wherein the at least one further control for editing the programmed functions enables programmed functions in the list of created functions to be deleted or re-ordered in the list.

10. A method according to claim 9 wherein each programming function is displayed in a form of one of "IF input condition THEN output action" and "IF NOT input condition THEN output action".

11. A method according to claim 9 further including periodically testing each input condition and performing a respective output action if required.

12. A method according to claim 9 further including enabling access to the task management screen directly from screens for configuration of radio channels and alarms.

13. A method according to claim 9 further including displaying a list of programming functions on the management screen for review and editing by the user.

14. A method according to claim 9 further including provision of maintenance functions for the user.

15. An apparatus for managing tasks for a radio station, including:
  a display device;
  a task manager to provide a graphical management interface on a display of the display device, including
    displaying a display region for presenting programmed functions of a radio station in a mobile radio network,
    displaying a first control for user selection of logic conditions to form the input of programmed functions,
    displaying a second control for user selection of output actions to be carried out by the radio station if the logic conditions selected from the first control are satisfied,
    displaying a third control for user insertion of a function created by selections using the first and second controls into the display region for programmed functions, and
    displaying at least one further control for user editing of the programmed functions, wherein the at least one further control for editing the programmed functions enables programmed functions in the list of created functions to be deleted or re-ordered in the list.

16. Apparatus according to claim 15 wherein the first and second controls list substantially every available input condition and every available output action of the station for selection by the user.

17. Apparatus according to claim 15 wherein the functions include control of station input/output, station alarms and external equipment.

18. Apparatus according to claim 15 wherein the management interface is a screen accessible by a user directly from screens for configuration of radio channel profiles, signaling or alarms.

19. Apparatus according to claim 15 which is a radio station, mobile radio station or service apparatus for a radio station.

\* \* \* \* \*